(12) United States Patent
Colvin

(10) Patent No.: US 7,860,771 B2
(45) Date of Patent: Dec. 28, 2010

(54) METHODS AND SYSTEMS FOR THE SECURITIZATION OF CERTIFICATES OF DEPOSIT

(76) Inventor: Robert Charles Colvin, 2710 Rockbridge Way, Highlands Ranch, CO (US)

( * ) Notice: Subject to any disclaimer, the term of this patent is extended or adjusted under 35 U.S.C. 154(b) by 361 days.

(21) Appl. No.: 11/679,607

(22) Filed: Feb. 27, 2007

(65) Prior Publication Data

US 2007/0143196 A1 Jun. 21, 2007

Related U.S. Application Data

(62) Division of application No. 10/990,160, filed on Nov. 15, 2004, now Pat. No. 7,206,761.

(60) Provisional application No. 60/520,411, filed on Nov. 13, 2003, provisional application No. 60/526,124, filed on Dec. 1, 2003.

(51) Int. Cl.
G06Q 40/00 (2006.01)
(52) U.S. Cl. ................... 705/35; 705/36 R; 705/37
(58) Field of Classification Search .................. 705/35, 705/37–39, 36 R
See application file for complete search history.

(56) References Cited

U.S. PATENT DOCUMENTS

| 5,291,398 | A | 3/1994 | Hagan |
| 5,631,828 | A | 5/1997 | Hagan |
| 5,864,685 | A | 1/1999 | Hagan |
| 6,374,231 | B1 | 4/2002 | Bent et al. |
| 7,206,761 | B2 | 4/2007 | Colvin |
| 2002/0091637 | A1 | 7/2002 | Bent et al. |
| 2003/0023529 | A1 | 1/2003 | Jacobsen |
| 2003/0041003 | A1 | 2/2003 | Kayser, III |
| 2003/0135437 | A1 | 7/2003 | Jacobsen |
| 2003/0135451 | A1 | 7/2003 | O'Brien et al. |
| 2003/0144950 | A1 | 7/2003 | O'Brien et al. |
| 2003/0163414 | A1 | 8/2003 | O'Brien et al. |
| 2004/0039674 | A1 | 2/2004 | Coloma |
| 2004/0111372 | A1 | 6/2004 | Durbano |
| 2005/0044038 | A1 | 2/2005 | Whiting et al. |
| 2005/0080739 | A1 | 4/2005 | Sherzan et al. |
| 2005/0080741 | A1 | 4/2005 | Sherzan |
| 2005/0114246 | A1* | 5/2005 | Coloma .................. 705/35 |

OTHER PUBLICATIONS

Kuehner-Hebert, Katie Bundling Small Banks' CDs For Institutional Investors. (FinancialOxygen Inc., Web CD Exchange Inc. team to offer CD portfolio service) (Brief Article), American Banker, p. 4, Apr. 26, 2002.
New York Times, May 12, 1981, col. 4, sec. 4.
Abstract of Pensions & Investment Age, Oct. 17, 1983, pp. 31-32.
Letter from Douglas H. Jones to William Colvin, Esq., Jul. 26, 2004, pp. 1-3.
Letter from Joseph A. DiNuzzo, Esq. to William Colvin, Esq., Dec. 19, 2002, pp. 1-3.
Letter from William Colvin, Esq. to Joseph A. DiNuzzo, Esq., Dec. 17, 2002, pp. 1.
Letter from William Colvin, Esq. to Joseph A. DiNuzzo, Esq., Oct. 18, 2002, pp. 1-6.

(Continued)

Primary Examiner—Jagdish N Patel

(57) ABSTRACT

Various embodiments of the present invention are directed to methods and systems for securitization of certificates of deposit. In addition, the present invention relates to a corresponding security itself (e.g., a security associated with one or more certificates of deposit). As such, in one embodiment, the present invention creates a more or less standard investment instrument (i.e. the funding certificate) by pooling the CDs to back the instument—thus, the net effect is the replacement of non-marketable instrument provided by financial institutions (i.e. the CD) with negotiable securities issued in the public capital markets (i.e. the funding certificate).

20 Claims, 3 Drawing Sheets

OTHER PUBLICATIONS

Delaware Code Annotated, Title 6. Commerce and Trade Subtitle II. Other Laws Relating to Commerce and Trade Chapter 18. Limited Liability Company Act Subchapter II. Formation; Certificate of Formation, §18-201 Certificate of Formation, pp. 1-2.

Code of Federal Regulations Title 12—Banks and Banking Chapter III—Federal Deposit Insurance Corporation Subchapter B—Regulations and Statements of General Policy Part 330—Deposit Insurance Coverage, §330.1—330.16.

12 U.S.C.A. § 1813, United States Code Annotated Currentness, Title 12. Banks and Banking, Chapter 16. Federal Deposit Insurance Corporation (Refs & Annos), §1813. Definitions.

15 U.S.C.A. § 80a-2, United States Code Annotated Currentness, Title 15. Commerce and Trade, Chapter 2D. Investment Companies and Advisers, Subchapter I. Investment Comapnies (Refs & Annos), §80a-2. Definitions.

17 CFR § 230.144A, Code of Federal Regulations Title 17—Commodity Exchanges, Chapter II—Securities and Exchange Commission, Part 230—General Rules and Regulations, Securities Act of 1933 General, § 230.144A Private resales of securities to institutions.

651 F.Supp.718, United States District Court, W.D. Missouri, Western Division, *Anheuser-Busch Employees Credit Union, et al., Plaintiffs* v. *The Federal Deposit Insurance Corporation*, Defendant. No. 83-0335-CV-W-0.

898 F.2d 482, United States District Court of Appeals, Fifth Circuit, *Abdulla Fouad & Sons, Plaintiff-Appellant*, v. *Federal Deposit Insurance Corporation*, Defendant-Appellee. No. 89-2544.

George, Adrienne, (Deposit Insurance Coverage of Corporate Accounts), FDIC-95-14, Aug. 23, 1995, pp. 1-2.

* cited by examiner

METHODS AND SYSTEMS FOR THE SECURITIZATION OF CERTIFICATES OF DEPOSIT

CROSS REFERENCE TO RELATED APPLICATIONS

This application is a divisional of U.S. Ser. No. 10/990,160, filed Nov. 15, 2004, now U.S. Pat. No. 7,206,761 which claims the benefit of U.S. Provisional Ser. No. 60/520,411, filed Nov. 13, 2003 and U.S. Provisional Ser. No. 60/526,124, filed Dec. 1, 2003. Each of the aforementioned applications is incorporated herein by reference in its entirety.

FIELD OF THE INVENTION

Various embodiments of the present invention are directed to methods and systems for securitization of certificates of deposit.

More particularly, one embodiment of the present invention provides I. A method implemented by a programmed computer system for use in connection with a financial transaction, which method comprises the steps of: forming a funding certificate issuer; offering to purchase at least one CD from each of a plurality of seller banks by the funding certificate issuer; providing each of the plurality of seller banks a mechanism to accept the offer; recording each acceptance; aggregating at least a portion of the CD's from the plurality of seller banks, which are recorded as acceptances, as pooled assets associated with a funding certificate, wherein the funding certificate is a note comprising either a debt, equity or a combination of debt and equity instrument; issuing the funding certificate from the funding certificate issuer to at least one investor; and using at least a portion of the proceeds from the issuance of the funding certificate to obtain the pooled assets.

Another embodiment of the present invention provides a method implemented by a programmed computer system for use in connection with a financial transaction, which method comprises the steps of: forming a funding certificate issuer; providing each of a plurality of seller banks an offer to issue the funding certificate issuer a CD; proving each of the plurality of seller banks a mechanism to accept the offer, recording each acceptance; aggregating at least some of the CD's which are recorded as acceptances as pooled assets associated with a funding certificate; collateralizing a loan with the pooled assets; purchasing the pooled assets in the name of the funding certificate issuer with the proceeds from the loan; selling the funding certificate from the funding certificate issuer to an investor so as to generate funding certificate proceeds; and using funding certificate proceeds to pay off the loan.

A further embodiment of the present invention, A method implemented by a programmed computer system for use in connection with a financial transaction, which method comprises the steps of: purchasing at least one CD from each of a plurality of seller banks by an issuer; aggregating at least a portion of the CD's from the plurality of seller banks as pooled assets associated with a funding certificate, wherein the funding certificate is a negotiable security issued in the public capital markets; and issuing the funding certificate from the funding certificate issuer to at least one investor; using at least a portion of the proceeds from the issuance of the funding certificate to obtain the pooled assets. For example, the issuer issues a plurality of funding certificates where each funding certificate corresponds to a specific sub-pool of CDs where each CD, in that sub-pool, has a substantially equivalent maturity date. In another example, the maturity date of the corresponding funding certificate corresponds to the CDs maturity date of that sub-pool.

Another embodiment of the present invention provides a method implemented by a programmed computer system for use in connection with a financial transaction, which method comprises the steps of: forming a funding certificate issuer; providing each of a plurality of seller banks an offer to issue the funding certificate issuer a CD; providing each of the plurality of seller banks a mechanism to accept the offer; recording each acceptance; aggregating at least some of the CD's which are recorded as acceptances as pooled assets associated with a funding certificate; and selling the funding certificate from the funding certificate issuer to an investor; wherein the pooled assets are essentially the sole assets of the funding certificate issuer.

For the purposes of the present application the term "entity" is intended to refer to any person, organization, or group.

Further, for the purposes of the present application the term "security" is intended to refer to an instrument evidencing debt and/or ownership of asset(s).

Further still, for the purposes of the present application the term "securitization" is intended to refer to providing an instrument evidencing debt and/or ownership of asset(s).

Further, for purposes of the present invention, unless otherwise stated, a "certificate of deposit" or "CD" is an instrument containing an acknowledgment by a bank that a sum of money has been received by the bank and a promise by the bank to repay the sum of money upon maturity of the instrument. As such, a certificate of deposit is a note of the bank.

Of note, various embodiments of the present invention may hereinafter sometimes be referred to below as the "Capital Market CD Program" or "Program".

Figure 1:
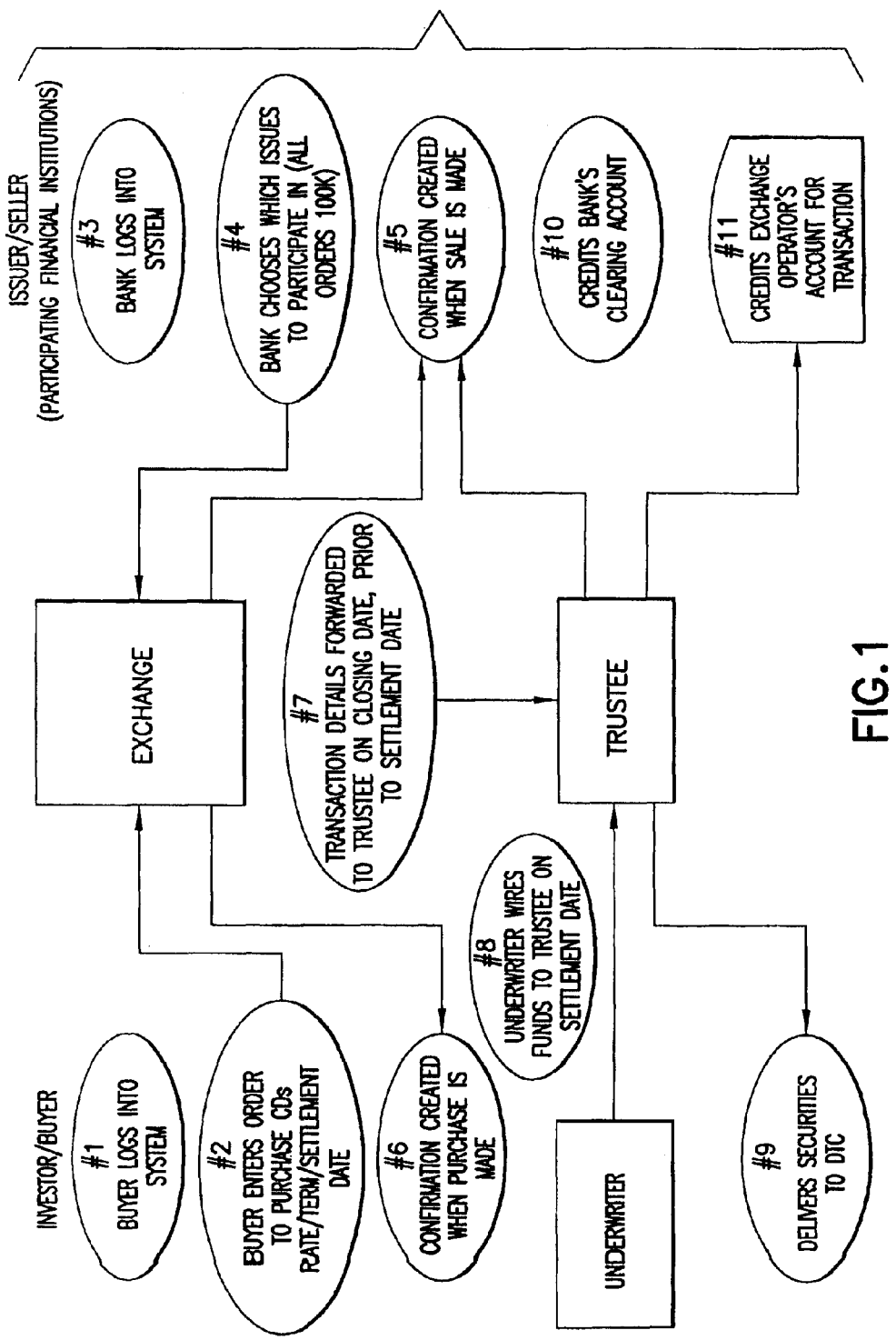
FIG. 1 shows a block diagram of certain steps carried out according to one embodiment of the present invention.

Among those benefits and improvements that have been disclosed, other objects and advantages of this invention will become apparent from the following description taken in conjunction with the accompanying figures. The figures constitute a part of this specification and include illustrative embodiments of the present invention and illustrate various objects and features thereof.

DETAILED DESCRIPTION OF THE INVENTION

Detailed embodiments of the present invention are disclosed herein; however, it is to be understood that the disclosed embodiments are merely illustrative of the invention that may be embodied in various forms. In addition, each of the examples given in connection with the various embodiments of the invention are intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

In one embodiment a method implemented by a programmed computer system for use in connection with a financial transaction is provided, which method comprises the steps of: forming a funding certificate issuer; providing each of a plurality of seller banks an offer to issue the funding certificate issuer a CD; providing each of the plurality of seller banks a mechanism to accept the offer; recording each acceptance; aggregating at least some of the CD's which are recorded as acceptances as pooled assets associated with a funding certificate; selling the funding certificate from the funding certificate issuer to an investor so as to generate proceeds; and using the proceeds from the sale of the funding certificate to purchase the pooled assets.

In one example, the funding certificate issuer may be a limited liability company.

In another example, a manager entity may control formation of the funding certificate issuer.

In another example, the manager entity may be a limited liability company.

In another example, a sponsor may own at least a portion of voting and profit interests in the manager entity.

In another example, the method may further comprise forming a plurality of funding certificate issuers, wherein each of the plurality of funding certificate issuers has associated therewith distinct pooled assets.

In another example, each of the plurality of seller banks may be (but not limited to): (a) a federal, state, or District of Columbia chartered depository institution, the deposits of which are FDIC insured under federal law; and/or (b) categorized as well capitalized under the FDIC Improvement Act of 1991.

In another example: (a) each of the plurality of seller banks may be provided a respective offer electronically via at least one of (but not be limited to): (i) an email message; and (ii) a website; and/or (b) the acceptance mechanism provided to each of the plurality of seller banks may include (but not be limited to) at least one of. (i) an email message; and (ii) a website.

In another example, the method may further comprise providing each of the plurality of seller banks a mechanism to reject the offer.

In another example, the rejection mechanism provided to each of the plurality of seller banks may include (but not be limited to) at least one of: (a) an email message; and (b) a website.

In another example, all of the CD's comprising the pooled assets may have the same interest rate and the same stated maturity.

In another example, each CD comprising the pooled assets may be in an amount, including a yield to a stated maturity, not in excess of x dollars, wherein x is an FDIC insurance cap.

In another example, essentially all of the proceeds from the sale of the funding certificate may be used to purchase the pooled assets.

In another example, a plurality of investors may purchase the funding certificate.

In another example, at least one of the offer to issue the funding certificate issuer a CD, the providing a mechanism to accept the offer, the sale of the funding certificate and/or the purchase of the pooled assets may be made using an automated order entry and clearing platform.

In another example, the steps may be carried out in the order recited.

In another example, the funding certificate issuer may be a special purpose limited liability company organized under the law of the state of Applicable state (e.g. Colorado, Delaware).

In another example, the funding certificate issuer may have management and operations governed by the terms of a limited liability company agreement.

In another example, the activities of the binding certificate issuer may be limited by the terms of the limited liability company agreement to: (a) purchasing, owning and collecting proceeds from the pooled assets; (b) selling the funding certificate; and/or (c) taking other actions and entering into agreements as are necessary for or incidental to activities (a) and (b).

In another example, the manager entity may control operations of the funding certificate issuer on a day to day basis.

In another example, the manager entity may be a special purpose limited liability company organized under the law of the applicable state (e.g. Applicable state (e.g. Colorado, Delaware), Colorado).

In another example, the sponsor may own essentially 100% of the voting and profit interests in the manager entity.

In another example, the funding certificate may represent a limited recourse obligation of the funding certificate issuer to pay a holder of the funding certificate a pro rata share of at least one of (but not be limited to): (a) the proceeds from the sale of the funding certificate; and/or (b) the pooled assets.

In another example, each acceptance may be recorded in a database.

In another example, each rejection may be recorded in a database.

In another example, the step of aggregating at least some of the CD's may comprise operating on at least one record in the database.

In another embodiment a method implemented by a programmed computer system for use in connection with a financial transaction is provided, which method comprises the steps of: forming a funding certificate issuer; providing each of a plurality of seller banks an offer to issue the funding certificate issuer a CD; providing each of the plurality of seller banks a mechanism to accept the offer; recording each acceptance; aggregating at least some of the CD's which are recorded as acceptances as pooled assets associated with a funding certificate; collateralizing a loan with the pooled assets; purchasing the pooled assets in the name of the funding certificate issuer with the proceeds from the loan; selling the funding certificate from the funding certificate issuer to an investor so as to generate funding certificate proceeds; and using the funding certificate proceeds to pay off the loan.

In one example, the funding certificate issuer may be a limited liability company.

In another example, a manager entity may control formation of the funding certificate issuer.

In another example, the manager entity may be a limited liability company.

In another example, a sponsor may own at least a portion of voting and profit interests in the manager entity.

In another example, the method may further comprise forming a plurality of funding certificate issuers, wherein each of the plurality of funding certificate issuers has associated therewith distinct pooled assets.

In another example, each of the plurality of seller banks may be (but not limited to): (a) a federal, state, or District of Columbia chartered depository institution, the deposits of which are FDIC insured under federal law; and/or (b) categorized as well capitalized under the FDIC Improvement Act of 1991.

In another example: (a) each of the plurality of seller banks may be provided a respective offer electronically via at least one of (but not be limited to): (i) an email message; and (ii) a website; and/or (b) the acceptance mechanism provided to each of the plurality of seller banks may include (but not be limited to) at least one of: (i) an email message; and (ii) a website.

In another example, the method may comprise providing each of the plurality of seller banks a mechanism to reject the offer, In another example, the rejection mechanism provided to each of the plurality of seller banks may include (but not be limited to) at least one of: (a) an email message; and/or (b) a website.

In another example, all of the CD's comprising the pooled assets may have the same interest rate and the same stated maturity.

In another example, each CD comprising the pooled assets may be in an amount, including a yield to a stated maturity, not in excess of x dollars, wherein x is an FDIC insurance cap.

In another example, the pooled assets may be utilized to collateralize essentially the entire loan.

In another example, essentially all of the proceeds of the loan may be utilized to purchase the pooled assets.

In another example, essentially all of the funding certificate proceeds from the sale of the funding certificate may be used to pay off essentially the entire loan.

In another example, a plurality of investors may purchase the funding certificate.

In another example, at least one of the offer to issue the funding certificate issuer a CD, the providing a mechanism to accept the offer, the collateralization of the loan, the purchase of the pooled assets, the sale of the funding certificate and/or the paying off of the loan may be made using an automated order entry and clearing platform.

In another example, the steps may be carried out in the order recited.

In another example, the funding certificate issuer may be a special purpose limited liability company organized under the law of the state of Applicable state (e.g. Colorado, Delaware).

In another example, the funding certificate issuer may have management and operations governed by the terms of a limited liability company agreement.

In another example, the activities of the funding certificate issuer may be limited by the terms of the limited liability company agreement to: (a) purchasing, owning and collecting proceeds from the pooled assets; (b) selling the funding certificate; and/or (c) taking other actions and entering into agreements as are necessary for or incidental to activities (a) and (b).

In another example, the manager entity may control operations of the funding certificate issuer on a day to day basis.

In another example, the manager entity may be a special purpose limited liability company organized under the law of the state of Applicable state (e.g. Colorado, Delaware).

In another example, the sponsor may own essentially 100% of the voting and profit interests in the manager entity.

In another example, the funding certificate may represent a limited recourse obligation of the funding certificate issuer to pay a holder of the funding certificate a pro rata share of at least one of (but not be limited to): (a) the proceeds from the sale of the funding certificate; and/or (b) the pooled assets.

In another example, each acceptance may be recorded in a database.

In another example, each rejection may be recorded in a database.

In another example, the step of aggregating at least some of the CD's may comprise operating on at least one record in the database.

In another embodiment a method implemented by a programmed computer system for use in connection with a financial transaction is provided, which method comprises the steps of: forming a funding certificate issuer; providing each of a plurality of seller banks an offer to issue the funding certificate issuer a CD; providing each of the plurality of seller banks a mechanism to accept the offer; recording each acceptance; aggregating at least some of the CD's which are recorded as acceptances as pooled assets associated with a funding certificate; and selling the funding certificate from the funding certificate issuer to an investor; wherein the pooled assets are essentially the sole assets of the funding certificate issuer.

In one example, the funding certificate issuer may be a limited liability company.

In another example, a manager entity may control formation of the funding certificate issuer.

In another example, the manager entity may be a limited liability company.

In another example, a sponsor may own at least a portion of voting and profit interests in the manager entity.

In another example, the method may comprise forming a plurality of funding certificate issuers, wherein each of the plurality of funding certificate issuers has associated therewith distinct pooled assets.

In another example, each of the plurality of seller banks may be (but not limited to): (a) a federal, state, or District of Columbia chartered depository institution, the deposits of which are FDIC insured under federal law; and/or (b) categorized as well capitalized under the FDIC Improvement Act of 1991.

In another example: (a) each of the plurality of seller banks may be provided a respective offer electronically via at least one of (but not be limited to): (i) an email message; and (ii) a website; and/or (b) the acceptance mechanism provided to each of the plurality of seller banks may include (but not be limited to) at least one of: (i) an email message; and (ii) a website.

In another example, the method may further comprise providing each of the plurality of seller banks a mechanism to reject the offer.

In another example, the rejection mechanism provided to each of the plurality of seller banks may include (but not be limited to) at least one of: (a) an email message; and (b) a website.

In another example, all of the CD's comprising the pooled assets may have the same interest rate and the same stated maturity.

In another example, each CD comprising the pooled assets may be in an amount, including a yield to a stated maturity, not in excess of x dollars, wherein x is an FDIC insurance cap.

In another example, the method may further comprise using proceeds from the sale of the funding certificate to purchase the pooled assets.

In another example, essentially all of the proceeds from the sale of the funding certificate may be used to purchase the pooled assets.

In another example, a plurality of investors may purchase the funding certificate.

In another example, at least one of the offer to issue the funding certificate issuer a CD, the providing a mechanism to accept the offer and/or the sale of the funding certificate may be made using an automated order entry and clearing platform.

In another example, the steps may be carried out in the order recited.

In another example, the funding certificate issuer may be a special purpose limited liability-company organized under the law of the state of Applicable state (e.g. Colorado, Delaware).

In another example, the funding certificate issuer may have management and operations governed by the terms of a limited liability company agreement.

In another example, the activities of the funding certificate issuer may be limited by the terms of the limited liability company agreement to: (a) purchasing, owning and collecting proceeds from the pooled assets; (b) selling the funding certificate; and/or (c) taking other actions and entering into agreements as are necessary for or incidental to activities (a) and (b).

In another example, the manager entity may control operations of the funding certificate issuer on a day to day basis.

In another example, the manager entity may be a special purpose limited liability company organized under the law of the state of Applicable state (e.g. Colorado, Delaware).

In another example, the sponsor may own essentially 100% of the voting and profit interests in the manager entity.

In another example, the funding certificate may represent a limited recourse obligation of the funding certificate issuer to pay a holder of the funding certificate a pro rata share of at least one of (but not be limited to): (a) the proceeds from the sale of the funding certificate; and/or (b) the pooled assets.

In another example, each acceptance may be recorded in a database.

In another example, each rejection may be recorded in a database.

In another example, the step of aggregating at least some of the CD's may comprise operating on at least one record in the database.

Another embodiment of the present invention provides a mechanism for a subscriber to raise non-brokered CD money on a regular, systematic basis (e.g., daily, weekly, monthly, quarterly, semi-annually, annually).

In one example, the Funding Company (the "Company") purchases FDIC insured CDs from a plurality of financial institutions (e.g. community-based). In one specific example, the purchase are accomplished through an electronic exchange ("eTn") (e.g. an exchange developed by IPFS by SunGard Financial Networks). The Company finances this purchase with an issuance of notes (e.g. medium term) to capital markets investors through a Reg. 144A placement. In one specific example, the notes are DTC eligible. In a specific example, a bank acts as clearing agent for the transactions conducted through the eTN. As such, in one embodiment, the present invention creates a more or less standard investment instrument (i.e. the funding certificate) by pooling the CDs to back the instrument—thus, the net effect is the replacement of non-marketable instrument provided by financial institutions (i.e. the CD) with negotiable securities issued in the public capital markets (i.e. the funding certificate).

In yet another example, an issuer aggregates CDs from a plurality of CD issuers (e.g. banks). The issuer issues one or more Funding Certificates to one or more investors while, in return, the investors provide funding, either directly or indirectly, to the issuer. The Funding Certificate is a note that may be a debt, equity or a combination of debt and equity instrument. In one embodiment, the issuer issues one Funding Certificate that corresponds to a specific pool of CDs where each CD has the substantial equivalent maturity date. As such, the maturity date of the Funding Certificate corresponds to the CDs maturity date. In another embodiment, the issuer issues a plurality of Funding Certificates where each Funding Certificate corresponds to a sub-pool that corresponds to a specific sub-pool of CDs where each CD, in that sub-pool, has the substantial equivalent maturity date—the maturity date of the corresponding Funding Certificate corresponds to the CDs maturity date of that sub-pool.

In a further example, at maturity of the Funding Certificate—the "unwinding" of the pool—each bank pays the pool owner of the CDs (e.g. the issuer or equivalent) the amount of the CD at maturity of the CD. These proceeds fund the payment, at maturity, of the Funding Certificate.

A summary of one embodiment of the present invention will now be described. More particularly, under this embodiment the present invention may operate as follows (the specific dates, time periods, interest rates and the like are, of course, provided simply as examples which are intended to be illustrative and not restrictive). In another example, a Parent Entity may initiate the "Capital Market CD Program", which may involve a series of limited liability companies (each an "Issuer") that may purchase certificates of deposit from eligible financial institutions (each a "Seller Bank"). Each Seller Bank may be required to be a federal, state or District of Columbia chartered depository institution, the deposits of which are eligible for FDIC insurance under federal law, and may be required to be categorized as "well-capitalized" under FDIC rules and regulations. The deposit account records of each Seller Bank may reflect that the Issuer, which purchased a certificate of deposit (each a "CD"), is the sole owner of that CD. Each Issuer may be a separate limited liability company organized under applicable state (e.g. Colorado, Delaware) law that is owned by qualified investors ("Investors"), as described below. Each Issuer may be managed by a separate applicable state (e.g. Colorado, Delaware) limited liability company (the "Facilitator") that may be wholly owned by the Parent Entity.

The following is an illustrative example the components of the Capital Market CD Program (e.g. the specific dates, time periods, interest rates and the like are, of course, provided simply as examples which are intended to be illustrative and not restrictive):

The Facilitator. The Parent Entity may form the Facilitator, a bankruptcy-remote limited liability company organized under the applicable state (e.g. Colorado, Delaware) Limited Liability Company Act, of which the Parent Entity may be the sole equity member. The Facilitator may at all times maintain a separate legal existence from the Parent Entity, from each Issuer, and from each Investor. The Facilitator may be the sole manager of each Issuer, and may offer ownership interests to Investors through the distribution of Funding Certificates (of course, under various other embodiments, one or more other classes may be utilized).

The Issuers. The Parent Entity or the Facilitator may form the Issuers, each of which may be a special purpose, bankruptcy-remote limited liability company organized under the applicable state (e.g. Colorado, Delaware) Limited Liability Company Act, of which the Facilitator may be the sole manager. Each Issuer may have a separate legal existence from the Parent Entity, the Facilitator, and from each other Issuer and each Investor. Each Issuer may be formed for a limited purpose, which may be primarily to acquire and hold a portfolio of CDs issued by a diverse set of well-capitalized Seller Banks according to the uniform terms as specified by each individual Issuer. In order to isolate the specific criteria set for each pool of CDs (hereinafter each a "Funding Pool"), the CDs held in a Funding Pool may need to be purchased and held by each Issuer as a separate entity. All CDs held in any one Funding Pool may need to qualify as FDIC insured deposits, although this may be only one of many criteria required to be satisfied in order for a CD to be isolated and pooled with other CDs in any Funding Pool. Although CDs may be required to be in a face amount (including yield to maturity) not in excess of, for example, $100,000.00, this limitation, together with the concentration limits (as more fully defined in the Termsheet described below) may help assure that any Funding Pool will hold uniform term obligations from a large pool of Seller Banks.

The CDs. Each Issuer may from time to time specify criteria for maturity, yield, interest payment dates and other relevant terms for the purchase of CDs from Seller Banks and may solicit offers from potential Seller Banks to sell CDs on a specified date (hereafter a "Funding Date") that meets the specified criteria. CDs purchased by an Issuer on any Funding Date may be issued by Seller Banks pursuant to standard documentation. Only those CDs that meet uniform specified requirements and the other criteria for eligibility may be purchased by an Issuer on any Funding Date. The stated final maturity date of all CDs acquired by any Issuer and held in its Funding Pool may be the same for each CD and may be expected to range, in one example, from 24 to 60 months from the date of purchase, although an Issuer may from time to time request issuance of CDs with shorter (or longer) maturities. It is expected that an Issuer may hold the CDs in its Funding Pool to maturity, and with limited exceptions, may only purchase CDs on its Funding Date. Seller Banks may issue their CDs at a discount to their face amount so that all fees and expenses related to a Funding may be paid or reserved on the Funding Date, rather than paid out of cash flow generated by the Funding Pool. All CDs in any one Funding Pool may need to be deposits insured by the FDIC.

The Investors. Each Investor may need to be a "qualified institutional buyer" under the provisions of Rule 144A that is also a "qualified purchaser" within the meaning of Section 2(a)(51)(A) of the Investment Company Act and related rules. In exchange for its investment in an Issuer, an Investor may receive a senior undivided pro rata equity interest in that Issuer, either in the form of debt or a form of undivided interest, evidenced by a Funding Certificate, pursuant to the terms of the Limited Liability Company Agreement of that Issuer. An Investor's beneficial interest in an Issuer may be treated for federal income tax purposes as an equity interest in an entity taxable as a partnership. All investments made by Investors in any Issuer may need to be used by that Issuer to purchase CDs from Seller Banks which will be held in that Issuer's Funding Pool, and to pay the fees and expenses of each Funding. In one specific example, there may only be one investor and that same investor or the sole investor in other Issuers.

Reference will now be made to an example customer transaction process associated with the Capital Market CD Program. Of note, this example customer transaction process is intended to be illustrative and not restrictive (e.g., all dates, times, values, etc. are intended to be illustrative and not restrictive) In any case, the example customer process may take the following form:

Implementation Steps: Customer may be required to complete appropriate documentation to receive offerings (e.g., via email and/or electronic posting at a Website)
"Participation Agreement for Capital Market CD Program"
Customer may agree to use email messaging and/or electronic use of a Website for acceptance/rejection of a deposit offer
Customer may agree to acceptance of ACH credits and debits for funds transfer (e.g., through an agent)
"Capital Market CD (CMCD) Customer Information Form" may require the following:
Institutional Information (name, address, insurance number, etc.)
ACH account number information
Authorized representative information (name, email, phone, etc.)
Capital Market CD Timeline
Thursday
Deposit offerings specifying offering details (e.g., for a $100 k CD) sent to customers (e.g., all authorized participants identified in each Customer Information Form).
Offerings may be sent via email and/or electronic posting at a Website (if sent by email, the email may include a link to an appropriate page on a Website).
Monday
All deposit offers may need to be accepted/rejected (by at least one authorized participant of each customer) by Monday, 4:00p.m. EST.
Acceptances/rejections may be made via electronic use of a Website (a "login screen" with a "username" and "password" may be used at the Website to provide proper identification and security in executing the transaction).
Once the customer has completed the login process, a Web Page permitting acceptance or rejection of the deposit offer maybe provided (the Web Page may specify the details of the offering).
If customer accepts the deposit offer, an acceptance verification Web Page (which may specify details of the offering) may be provided (allowing the customer to confirm acceptance or reconsider acceptance).
If customer confirms acceptance, an offer accepted Web Page may be provided (which may specify details of the offering) and all authorized participants associated with the customer may receive an acknowledgement (e.g., via email) specifying details of the offering.
If customer rejects the deposit offer, a rejection verification Web Page (which may specify details of the offering) may be provided (allowing the customer to confirm rejection or reconsider rejection).
If customer confirms rejection, an offer rejected Web Page may be provided (which may specify details of the offering) and all authorized participants associated with the customer may receive an acknowledgement (e.g., via email) of the rejection.
Wednesday
Final settlement confirmation (which may specify final details of the deposit) sent to customers accepting deposits (confirmation may be sent via email to all authorized participants of each customer accepting a deposit).
ACH transfer to participating banks completing the transaction.

Continuing with the above example, on Monday, the Investors are informed of the amount of the Funding Certificate that corresponds to the confined orders by the customers. On Wednesday, the Funding Certificate is issued to the Investors that corresponds to the pool of CD's that occurred with the final settlement confirmation. In one embodiment, the final settlement confirmation and the issuance of the Funding Certificate are completed simultaneously. In another embodiment, the issuance and settlement are done sequentially in either order.

Reference will now be made to an example "Funding Certificates Termsheet" (hereinafter "Termsheet"). Of note, this example Termsheet is intended to be illustrative and not restrictive (e.g., all dates, times, values, etc. are intended to be illustrative and not restrictive). In any case, the example Termsheet may include the following:

Issuer: The Issuer may be a special purpose limited liability company organized under applicable state (e.g. Colorado, Delaware) law. Its management and operations may be governed by the terms of a Limited Liability Company Agreement (hereinafter the "Operating Agreement"). The activities of the Issuer may be limited by the terms of its Operating Agreement to: (i) purchasing, owning and collecting proceeds from eligible certificates of deposit and related assets; (ii) issuing the Funding Certificates, and (iii) taking such actions and entering into such agreements as are necessary or incidental to the foregoing.

Manager: The Manager may be a special purpose limited liability company organized under applicable state (e.g. Colorado, Delaware) law and wholly owned by the Sponsor. The Manager may arrange, on behalf of the Issuer, for the simultaneous closing of the issuance of the Funding Certificates and the purchase from Seller Banks of eligible certificates of deposit to be held by the Issuer. In addition, the Manager may act as manager of the Issuer under the terms of the Operating Agreement and may control all day to day operations of the Issuer not otherwise delegated to the Administrative Agent/indenture Trustee or Escrow Agent but subject to the restrictions set forth in the Operating Agreement and the Indenture.

Sponsor: The Sponsor may own 100% of the voting and profit interests in the Manager.

Funding Certificate Program: The Issuer may be formed and the Funding Certificates offered pursuant to a program under which the Manager may from time to time (e.g., periodically) arrange for the formation of a special purpose issuer and the issuance by such issuer of funding certificates, the proceeds of which are used to purchase pools of certificates of deposit from eligible institutions. There may be generally only one funding date, one series of funding certificates and one pool of certificates of deposit for each Issuer. Each of the Manager, the Escrow Agent and the Administrative Agent/Indenture Trustee may act in capacities similar to those described herein for each Issuer formed under the program.

Escrow Agent: Any appropriate entity may be appointed as Escrow Agent under an Escrow Agreement among the Escrow Agent, the Manager and the Issuer (the "Escrow Agreement"). Pursuant to the terms of the Escrow Agreement, the Escrow Agent may receive and hold all proceeds from subscriptions for the Funding Certificates and, in accordance with the Closing Notice, apply such proceeds to the purchase of certificates of deposit from the Seller Banks for the account of the Issuer, payment of certain closing expenses and making of deposits into certain reserve accounts.

Administrative Agent/Indenture Trustee: Any appropriate entity may be appointed as Administrative Agent/Indenture Trustee of the Issuer under an Indenture among the Administrative Agent/Indenture Trustee, the Manager and the Issuer (the "Indenture"). Pursuant to the Indenture, the Indenture Trustee may: (i) open and maintain on behalf of the Issuer a CD Account for holding the certificates of deposit, which may be issued in book-entry form, a Collection Account for receipt of collections on the Funding Pool, an Expense Reserve Account and if required a Proceeds Account; (ii) act as custodian for the Issuer by holding originals of all documentation specific to the transaction; (iii) make collections on the Funding Pool by processing ACH debits against the Seller Banks on the applicable CD Payment Dates for interest and principal; (iv) make distributions on the Funding Certificates from the Collection Account; (v) be designated and act as collateral agent for the benefit of the holders of the Funding Certificates of an Issuer with respect to the Funding Pool of that Issuer and its rights in any deposit accounts maintained by it or on its behalf; and (vi) prepare and distribute periodic reports with respect to the Funding Pool (and/or regarding the Issuer and the Seller Banks).

In addition, the Indenture Trustee may open and maintain in the name of the Manager for the benefit of each Issuer as designated by the Manager from time to time an Advance Reserve Account. The Indenture Trustee may debit the Advance Reserve Account on the terms provided in the Indenture if necessary to maintain liquidity for timely distributions on the Funding Certificates. See "Advance Reserve Account; Advance Reserve Account Payments."

Seller Bank: A Seller Bank may be any eligible financial institution from which the Issuer purchases one or more certificates of deposit on the Funding Date. To be eligible to be a Seller Bank, a financial institution may need to, at the time of issuance of its certificate of deposit: (i) be a federal, state or District of Columbia chartered depository institution, whether or not a member of the Federal Reserve System, the deposits of which are FDIC insured under federal law; (ii) be categorized as "well capitalized" under the FDIC Improvement Act of 1991; and (iii) have executed a Participation Agreement For Capital Market CD Program (a "Participation Agreement") with the Manager.

Under its Participation Agreement, a Seller Bank may agree, among other things, to use of a password protected internet website and email messaging for accepting or rejecting an offer for issuance of a CD and to the making of payments on its certificates of deposit via ACH credits and debits.

Funding Pool: On the Funding Date, the Issuer may acquire a pool of certificates of deposit issued by Seller Banks (the "Funding Pool"), which certificates of deposit may contain the terms specified in the CD Offer Sheet prepared by the Manager and confirmed on the Funding Date. All certificates of deposit in the Funding Pool may have the same maturity date and same interest rate. The aggregate principal amount of certificates of deposit in the Funding Pool (the "Funding Pool Amount") may equal the aggregate face amount of the Funding Certificates.

Funding Certificates: Each Funding Certificate of an Issuer may represent a limited recourse obligation of that Issuer to pay to the holder thereof to its pro rata share of the proceeds collected with respect to the Funding Pool and related assets owned by the Issuer as and when due in accordance with the terms of that Funding Certificate.

On or before the Funding Date of any Issuer, the Manager, in exchange for its membership interest in an Issuer, may contribute to the capital of that Issuer an amount equal to the specified amount required to be maintained as allocated to that Issuer in the Advance Reserve Account, Pursuant to the terms of the Operating Agreement, the Issuer may be prohibited from: (i) issuing any other classes of membership interest; or (ii) incurring any debt for borrowed money (other than the Funding Certificates). In addition, all anticipated fees and expenses, such as Administration Fees, Manager Fees and Escrow Fees, may be paid or funded to a reserve account (an "Expense Reserve Account") on the Funding Date for an Issuer. Thus, 100% of the interest and principal collected on or with respect to the Funding Pool may be distributed to the holders of the Funding Certificates.

Recourse for repayment of the Funding Certificates may be limited solely to the assets of the Issuer and may not necessarily represent recourse obligations of any other person. Proceeds derived from the certificates of deposit held in the Funding Pool may be substantially the only source of funds available to repay the Funding Certificates.

Funding Certificate Purchase Price: The purchase price for each Funding Certificate may equal its pro rata share, by Funding Certificate balance, of 100% of the Funding Pool Amount.

Funding Date; Minimum & Maximum Offering Size: The Manager may set Funding Date(s) as desired (such Funding Dates may occur from time to time (e.g., periodically)). In one example (which example is intended to be illustrative and not restrictive), a Funding Date may be set by the Manager once the Issuer has received subscriptions for at least $10,000,000 of Funding Certificates. In another example (which example is intended to be illustrative and not restrictive), the maximum amount of subscriptions for Funding Certificates that will be accepted may be $95,000,000.

Payment Dates, CD Payment Dates: A Payment Date may be any date set for distributions on the Funding Certificate, including, without limitation, its Final Maturity Date. Each Payment Date may occur, for example, five (5) business days after a CD Payment Date. A CD Payment Date may be the date on which payments of interest and/or principal are due from the Seller Banks with respect to the certificates of deposit in the Funding Pool. If any CD Payment Date is not a business day, the CD Payment Date may be the next succeeding business day. The scheduled Payment Dates and CD Payment Dates may be determined on or before the Funding Date.

Final Maturing Date: The Final Maturity Date for the Funding Certificates may be, for example, five (5) business days after the maturity date of the certificates of deposit in the Funding Pool.

Interest Payments: Interest on the Funding Certificates may accrue at a specified rate and may be distributed in arrears on each Payment Date to the Holders of the Funding Certificates from proceeds of interest collected with respect to the Funding Pool. The amount and frequency of interest payments on the Funding Certificates may depend upon, among other things, the amount and frequency of interest payments made with respect to the certificates of deposit in the Funding Pool and the terms and aggregate amounts of any Replacement CDs or proceeds that remain on deposit in the Proceeds Account for purposes of such reinvestment. In one example (which example is intended to be illustrative and not restrictive), no interest will accrue on or be payable with respect to any amounts deposited in the Escrow Account on behalf of a Funding Certificate prior to the Funding Date or during the five (5) business days between the a CD Payment Date and the Payment Date.

Principal Repayment of the Funding Certificates: In one example (which example is intended to be illustrative and not restrictive), on the Final Maturity Date, all amounts held in the Collection Account, including all principal and accrued and unpaid interest collected on the certificates of deposit held in the Funding Pool, plus all amounts (if any) then held in the Proceeds Account, may be distributed as a repayment of principal (and any accrued and unpaid interest) to the Holders of the Funding Certificate. If amounts held in the Collection Account and the Proceeds Account are insufficient to pay in full all principal and accrued and unpaid interest on the Funding Certificates, funds held in the Advance Reserve Account may be transferred to the Collection Account and distributed to the Funding Certificate holders to effect such payments of principal and interest.

Ratings: It may be a condition to the issuance of the Funding Certificates that they be rated "AAA" by Standard & Poor's Ratings Services, a division of The McGraw-Hill Companies, Inc. ("Standard & Poor's") and/or "Aaa" by Moody's Investors Service, Inc. ("Moody's") (together with Standard and Poor's, each a "Rating Agency"). The rating assigned to the Funding Certificates by the Rating Agencies is not necessarily a recommendation to buy and may address only the likelihood of principal repayment by maturity and the timely payment of interest on the Funding Certificates.

Net Proceeds: The net proceeds from the issuance and sale of the Funding Certificates may be used by the Issuer to purchase the Funding Pool. Such net proceeds may equal the gross proceeds to the Issuer from the sale and issuance of the Funding Certificates less the following amounts (hereinafter the "Transaction Expenses"): (i) organizational and structuring fees (including, without limitation, the legal fees and expenses of counsel to the Issuer and the Manager); (ii) expenses of offering the Funding Certificates (including, without limitation) fees payable to the Initial Purchaser in connection with the offering of the Funding Certificates); (iii) fees payable to the Rating Agencies in connection with the ratings of the Funding Certificates; (iv) a fee (e.g., one time fee) payable to the Manager in connection with its services for the Funding Date; (v) a fee (e.g., one time fee) payable to the Escrow Agent in connection with its escrow services for the Funding Date; and/or (vi) a fee (e.g., an upfront fee) payable to the Indenture Trustee on the Funding Date along with a deposit into the Reserve Account to cover future periodic fees payable to the Indenture Trustee by the Issuer. All anticipated fees and expenses of the Issuer may be expected to be paid or fully funded to a reserve account on the Funding Date. The gross proceeds, net proceeds and the Transaction Expenses may be itemized.

The CDs: Each Certificate of Deposit ("CD") may be evidenced by standard documentation utilizing forms specified by the Manager. In one example (which example is intended to be illustrative and not restrictive), no CD may contain any call feature or other terms permitting its prepayment at the option of the Seller Bank. The Issuer may assure that the deposit account records of the Seller Bank are clear and unambiguous in showing the Issuer as the owner of the fends deposited with respect to its CD purchased by such Issuer from that Seller Bank. The Issuer may instruct each Seller Bank to remit all payments on account of CDs issued by that Seller Bank for that Issuer to the Collection Account held in the name of the Issuer with the Indenture Trustee. The Indenture Trustee may process all payments made by Seller Banks through ACH debits. See "Seller Bank Participation Agreement."

Concentration Limits: The Issuer may be prohibited from acquiring CDs in an aggregate amount (including yield to stated maturity) in excess of a certain limit (e.g., $100,000): (i) from any one Seller Bank; or (ii) from any number of different Seller Banks if such Seller Banks are not separately chartered and insured depository institutions from all other Seller Banks with CDs in that Funding Pool.

The Issuer may be prohibited from holding any deposit accounts (including the Expense Reserve Account or the Advance Reserve Account) with any Seller Bank from which it has acquired a CD. If the Issuer holds finds on deposit in any institution that is or becomes a Seller Bank, all amounts owing with respect to any CD in the Funding Pool (including all interest that would have accrued in the amounts and on the dates specified in the applicable CD, whether or not, on the date for payment thereof, such amounts: (a) have been unconditionally credited to the Issuer on account of such certificate of deposit; or (b) would otherwise have been insured deposits of such Seller Bank), may be deemed to be the insured deposits entitled to recovery prior to any other funds held by the Issuer with such Seller Bank. Principal payable with respect to each certificate of deposit held in a Funding Pool, and as of any date of determination all interest accrued thereon, may be expected to be fully insured by the FDIC.

CD Offers; CD Offer Dates: The Issuer, through the Manager, may solicit firm offers from potential Seller Bans to sell to it on the Funding Date CDs that: (i) meet the criteria for eligibility for inclusion in a Funding Pool; (ii) meet the specified criteria for maturity, yield, and interest payment dates, and such other criteria as the Manager specifies in the CD Offer Sheet; and (iii) will be issued in book-entry form pursuant to standard documentation presented by the Manager. Only those CDs that meet uniform specified requirements may be included in the Funding Pool on the Funding Date. Each CD Offer Sheet used for solicitation of offers from Seller Banks may specify the date by which firm offers must be received by the Manager (the "CD Offer Date") and the date through which such offers must remain open (i.e., the proposed Funding Date). The CD Offer Date may be expected to occur, for example, at least one (1) but no more than four (4) business days prior to the Funding Date.

Expected CD Maturity Dates: Under this program, the Manager may generally arrange for CDs with Final Maturity Dates that range, for example, from twenty-four to sixty months, although the Manager may from time to time request CD Offers with Final Maturity Dates shorter (or longer), depending upon its assessment of market conditions. The Final Maturity Date for the Funding may be specified by the CD Offer Date. All CDs acquired for the Issuer's Funding Pool may be expected to have the same Final Maturity Date.

CD Issue Price: The Issue Price paid by the Issuer to the applicable Seller Banks for CDs in its Funding Pool may be 100% of the aggregate face amount of such CDs less such Seller Bank's allocable share of the Transaction Expenses.

Other Issuer Assets: In addition to the interests of the Issuer in the CDs held in its Funding Pool, which the Issuer may pledge to the Indenture Trustee acting as collateral agent on behalf of the Funding Certificate holders, the Issuer may have: (i) rights in, to and under the Escrow Agreement; (ii) all right, title and interest in, to and under the Collection Account and all amounts from time to time held in the Collection Account; (iii) all right, title and interest in, to and under the Expense Reserve Account and all amounts from time to time held in the Expense Reserve Account (to the extent not then due and payable to the Administrative Agent as Administrative Agency Fee or to any other person entitled thereto); (iv) all right, title and interest in, to and under its allocable share of the Advance Reserve Account, any Proceeds Account and any other deposit accounts established pursuant to the Operating Agreement or otherwise in the name of or for the benefit of the Issuer; (v) all right, title and interest in, to and under any Proceeds Account and any other deposit accounts established pursuant to the Operating Agreement or otherwise in the name of or for the benefit of the Issuer; (vi) all insurance proceeds received with respect to any CD in a Funding Pool; (vii) all Eligible Reserve Investments and Eligible Proceeds Investments of the Issuer; and (viii) all proceeds of the foregoing. The Issuer may pledge some or all of the foregoing (other than the Expense Reserve Account and amounts held therein, for example) as additional collateral.

Transferability: Funding Certificates may be transferable by Certificate Holders, subject to certain limitations, including (for example) the following: (i) each subsequent holder of a Funding Certificate may need to meet the eligibility requirements as a: (a) "qualified purchaser" under the Investment Company Act of 1940, as amended ("Qualified Purchasers"); and (b) "qualified institutional buyer" as defined in Rule 144A under the Securities Act ("Qualified Institutional Buyers") and/or to other institutional "accredited investors" as defined in Rule 501(a)(1), (2), (3) or (7) of Regulation D of the Securities Act for initial Certificate Holders, and may be required to make the same representations as the initial holders; (ii) no Certificate may be transferred in part; and (iii) such other restrictions as may be necessary or advisable to provide the Issuer with a reasonable belief that any subsequent holder of the Funding Certificate qualifies as a Qualified Institutional Buyer and a Qualified Purchaser.

Any purported transfer of a Certificate in violation of the requirements for transfer may be void and the holder immediately prior to such void transfer may be for all purposes be deemed to be the holder of that Certificate.

In addition, the Indenture may provide the Issuer with the right to force any holder who is determined not to be a Qualified Institutional Buyer/Qualified Purchaser to sell that Funding Certificate to a Qualified Institutional Buyer/Qualified Purchaser.

Tax Attributes: The Issuer may be intended to be classified as a partnership for federal income tax purposes and each Funding Certificate as indebtedness of the Issuer secured by its assets.

Cash Management: If at any time after a Funding Date the Issuer receives CD Proceeds with respect to any CD in its Funding Pool, or receives any payment on account of a Manager indemnification, the Issuer may: (i) distribute on the next Payment Date such amounts to the Certificate Holders as provided in the Operating Agreement; and/or (ii) invest such amounts in Eligible Proceeds Investments.

The Issuer may invest finds held in the Expense Reserve Account and the Advance Reserve Account in Eligible Reserve Investments.

Eligible Proceeds Investments: Eligible Proceeds Investments may mean, with respect to amounts held in the Proceeds Account, investments that meet all of the following criteria:

i) (A) marketable direct obligations issued or unconditionally guaranteed by the United States or issued by any agency thereof and backed by the full faith and credit of the United States, or issued by any state of the United States or any political subdivision of any such state or any public instrumentality thereof and, at the time of acquisition, having the highest rating obtainable from either S&P or Moody's; or (B) FDIC insured bank deposits, that is (currently), bank deposit accounts that are in an amount less than or equal to $100,000 in the aggregate issued by any financial institution insured by the Federal Deposit Insurance Corporation other than a Seller Bank with respect to that Funding Pool (each an "Investment");

(ii) the final maturity date of any Investment is not later than the Final Maturity Date of CDs in the Funding Pool of that Issuer; and (iii) the annualized yield of such Investment is equal to or greater than the annualized yield of CDs held in the Funding Pool of that Issuer as established on the Funding Date for that Issuer.

Eligible Reserve Investments: Eligible Reserve Investments may mean any and all of the following, so long as, (i) with respect to investments held in the Expense Reserve Account, the final maturity date thereof is not later than the Final Maturity Date and such Expense Reserve Account holds in immediately available funds amounts sufficient to make all scheduled Administrative Agent Fees as and when due; and (ii) with respect to investments held in the Advance Reserve Account, the average maturity date of such investments is not longer than, for example, six (6) months:

(a) direct obligations of, and obligations fully guaranteed by, the United States of America, the Federal Home Loan Mortgage Corporation, the Federal National Mortgage Association, the Federal Home Loan Banks or any agency or instrumentality of the United States of America the obligations of which are backed by the full faith and credit of the United States of America (b) (i) demand and time deposits in, certificates of deposit of, banker's acceptances issued by or federal funds sold by any depository institution or trust company (including the Administrative Agent/Indenture Trustee or its agent acting in their respective commercial capacities) incorporated under the laws of the United States of America or any State thereof and subject to supervision and examination by federal and/or state authorities, so long as at the time of such investment or contractual commitment providing for such investment, such depository institution or trust company has a short term unsecured debt rating in one of the two highest available rating categories of S&P and the highest available rating category of Moody's and provided that each such investment has an original maturity of no more than 365 days, and (ii) any other demand or time deposit or deposit which is fully insured by the FDIC (c) repurchase obligations with a term not to exceed 30 days with respect to any security described in clause (a) above and entered into with a depository institution or trust company (acting as a principal) rated "A" or higher by S&P, rated A2 or higher by Moody's; provided, however, that collateral transferred pursuant to such repurchase obligation must be of the type described in clause (a) above and must: (i) be valued weekly at current market price plus accrued interest; (ii) pursuant to such valuation, equal, at all times, 105% of the cash transferred by the Administrative Agent/Indenture Trustee in exchange for such collateral; and (iii) be delivered to the Administrative Agent/Indenture Trustee or, if the Administrative Agent/Indenture Trustee is supplying the collateral, an agent for the Administrative Agent/Indenture Trustee, in such a manner as to accomplish perfection of a security interest in the collateral by possession of certificated securities (d) securities bearing interest or sold at a discount issued by any corporation incorporated under the laws of the United States of America or any State thereof which has a long term unsecured debt rating in the highest available rating category of each of the Rating Agencies at the time of such investment (e) commercial paper having an original maturity of less than 365 days and issued by an institution having a short term unsecured debt rating in the highest available rating category of each of the Rating Agencies at the time of such investment (f) a guaranteed investment contract approved by each of the Rating Agencies and the applicable Issuer and issued by an insurance company or other corporation having a long term unsecured debt rating in the highest available rating category of each of the Rating Agencies at the time of such investment (g) money market funds having ratings in one of the two highest available rating categories of S&P and the highest available rating category of Moody's at the time of such investment which invest only in other Eligible Investments; any such money market funds which provide for demand withdrawals being conclusively deemed to satisfy any maturity requirement for Eligible Investments set forth in this Agreement; and (h) any other investment approved by the applicable Issuer and each Rating Agency.

Operating Agreement: The Issuer may be organized as a bankruptcy remote special purpose entity and operated pursuant to the terms of a limited liability company agreement, which may, among other things, designate the Manager as the manager.

Indenture: The Manager may enter into an Indenture with the Indenture Trustee. The Issuer may become a party to the Indenture by execution of a Supplement to that agreement. Pursuant to the Indenture, the Issuer may issue its Funding Certificates. The proceeds of all Funding Certificates issued by any Issuer may be received by, and the payment for purchases of all CDs to be held in any Funding Pool may be made by, the Indenture Trustee, acting on behalf of the Issuer. The Issuer may grant a first priority security interest in and pledge all of the CDs held in its Funding Pool, and the proceeds thereof, to the Indenture Trustee for the benefit of the holders of the Funding Certificates of that Issuer, as collateral security for that Issuer's obligations under its Funding Certificates. All payments on the CDs may be required to be remitted to the Collection Account and disbursed pursuant to the terms of the Indenture.

Seller Bank Participation Agreement: In order to facilitate the timeliness of payments to be made by any Seller Bank, each Seller Bank may be required to execute and deliver a Participation Agreement for Capital Market CD Program, pursuant to which, among other things, the Seller Bank may need to agree to Automated Clearing House ("ACH") transfers for all amounts owing by it, as and when due. The Administrative Agent/Indenture Trustee may test ACH transfer information provided by a Seller Bank prior to the purchase of any CD from that Seller Bank.

Manager Duties with respect to arranging CDs for the Funding Pool: Under the Operating Agreement, the Issuer may be permitted to acquire only those CDs for the Issuer's Funding Pool which, to the best of its knowledge, meet the eligibility criteria specified therein. If a CD is determined not to have been eligible as of its Funding Date, the Manager may be required to enforce, on behalf of the Issuer, any rights it may have against such Selling Bank with respect to the grounds causing such ineligibility.

Manager Indemnification: The Manager may indemnify the Issuer for any losses arising out of its gross negligence or willful misconduct in carrying out its duties to or on behalf of the Issuer under the transaction documents.

Available Funds; Payments: All monies collected, received or otherwise recovered in respect of CDs held in a Funding Pool, including the proceeds of any FDIC insurance (the "Available Funds"), may be deposited in the Collection Account and distributed to Certificate Holders on the next succeeding Payment Date pursuant to the terms of the Indenture, unless held in the Proceeds Account reinvested in Eligible Proceeds Investments. All Available Funds (including, for example, all proceeds of Eligible Proceeds Investments) may need to be distributed to Certificate Holders pursuant to the terms of the Indenture not later than the Final Maturity Date for the Funding Certificates. Certificate Holders may receive distributions with respect to the Funding Certificates of interest on each Payment Date and of principal on the Final Maturity Date in accordance with their respective pro rata shares. As stated above, the Issue Price for any CD in a Funding Pool may be 100% of its face amount less its allocable share of the Transaction Expenses. Amounts to become due after the applicable Funding Date in respect of Administrative Agency Fees may be funded on the applicable Funding Date and held in the Expense Reserve Account and paid to the Administrative Agent as and when due. Thus, generally, 100% of all Available Funds received on account of CDs in a Funding Pool, both in respect of interest and principal, may be payable to Funding Certificate Holders on each Payment Date.

Advance Reserve Account; Advance Reserve Account Payments: The Manager may establish with the Administrative Agent/Indenture Trustee a reserve account (the "Advance Reserve Account"). The Manager may at all times be required to maintain a minimum on deposit in the Advance Reserve Account (the "Advance Reserve Account Minimum Amount"). The Advance Reserve Account may be held for the benefit of each Issuer, and all amounts on deposit from time to time therein may be available to any Issuer for payment of amounts due on any Payment Date. Only one Advance Reserve Account may be established for the program. As such, amounts held in the Advance Reserve Account allocated to any one issuer may be commingled with amounts allocated to other issuers and may be available without segregation with respect to payments on account of any Delinquent CD (as described below) in any Funding Pool. If on any CD Payment Date the Indenture Trustee has not received the full amount due on such CD Payment Date from any Seller Bank (or as proceeds of FDIC Insurance or otherwise) with respect to its CD (a "Delinquent CD"), the Indenture Trustee may be authorized and instructed to transfer from the Advance Reserve Account to the Collection Account by not later than the Payment Date immediately after that CD Payment Date an amount equal to the unpaid portion then due from such Seller Bank with respect to its CD but not received and deposited in the Collection Account on or prior to the related Payment Date. Amounts from a Seller Bank, and any CD proceeds, collected on account of a Delinquent CD may be deposited into the Advance Reserve Account. Any amounts held in the Advance Reserve Account in excess of the Advance Reserve Account Minimum Amount may be released to the Manager.

Collection Account: The Indenture Trustee may establish a collection account (the "Collection Account") in the Issuer's name. The Collection Account may be established as a fully segregated account with the Indenture Trustee or another eligible domestic bank other than any Seller Bank (the "Collection Account Bank") designated by the Manager that is satisfactory to the Rating Agencies. Payments received on the CDs may need to be remitted to the Collection Account in accordance with the terms of the Indenture. The Collection Account Bank may waive all rights of setoff and bankers' liens with respect to all liabilities and obligations (including Administrative Agency Fees) owing to it by the Issuer, other than in respect of its ordinary and customary fees in connection with maintenance of the Collection Account and for any items returned for nonpayment.

Escrow Account: The Manager may cause an Escrow Account to be established with the Escrow Agent for the benefit of the Issuer under the Escrow Agreement. All funds received from purchasers of Funding Certificates may be deposited in the Escrow Account. On each Funding Date, finds held in the Escrow Account may be used to pay the Issue Price to Seller Banks in respect of CDs being acquired by the Issuer on the Funding Date and to pay the Transaction Expenses, The Escrow Agent may hold all finds in the Escrow Account for the benefit of the purchasers of the Funding Certificates until such time as CDs are purchased for the Issuer. If for any reason any Seller Bank can not or will not issue its CD, or any CD to be purchased for the Funding Pool on the Funding Date has otherwise not been purchased by the Issuer within (e.g., three (3)) business days after the proposed Funding Date for such purchase, the Escrow Agent may return to the respective purchasers of such Funding Certificates the finds so received (net of usual and customary fees and expenses of the Escrow Agent incurred in connection with the receipt, holding and return of such funds), or such portion of such funds, pro rata, remaining after the purchase of CDs on that Funding Date for a Funding Pool. Any excess amounts (i.e., on account of accrued interest, if any) may be paid to the Issuer.

Optional Prepayments and Redemptions: An Issuer may, at its option prepay, for example, all but not less than all of the then outstanding the Funding Certificates in the unlikely event that the aggregate original face amount of all outstanding Funding Certificates over the aggregate amount of all payments made on account of the Funding Certificates is less than, for example, 10% of the aggregate original face amount of such outstanding Funding Certificates ("Optional Prepayment").

CD Proceeds; Proceeds Account: CD Proceeds may arise as a consequence of payment prior to maturity of a CD on account of: (i) receipt of proceeds under an FDIC insurance claim; and/or (ii) an assignment by the FDIC as conservator or receiver of an insolvent Seller Bank in which the assignee elects to terminate the CD prior to its maturity. All amounts received by an Issuer as CD Proceeds or on account of a Manager Indemnification may be deposited into an account in the name of the Issuer (the "Proceeds Account")+Amounts held in the Proceeds Account may be invested in Eligible Proceeds Investments.

No Acceleration of Funding Certificates: No Certificate Holder may necessarily be entitled to require the payment of principal owing under a Funding Certificate prior to its stated Final Maturity Date. Other than an Optional Prepayment or as a result of CD Proceeds or on account of a Manager Indemnification as described above, no principal may necessarily be distributed on the Funding Certificates until the Final Maturity Date.

Escrow Fees: The Escrow Agent may be entitled to a specified number of basis points (e.g., five (5) basis points) of each Funding Pool Amount as an Escrow Fee under the Escrow Agreement. The Escrow Fee may be paid in full on the Funding Date.

Administrative Agency Fees: The Administrative Agent may be entitled to Administrative Agency Fees under the Indenture. The amount of the Administrative Agency Fee may be a specified number of basis points (e.g., seven and a half (7.5) basis points) per annum on the Funding Pool Amount. The Administrative Agency Fee due for the initial (e.g., six (6) months) may be payable to the Administrative Agent on the Funding Date, and the balance of the Administrative Agency Fees may be payable to the Administrative Agent (e.g., semi-annually) in equal amounts from the Expense Reserve Account. If the Administrative Agent/Indenture Trustee is unable or unwilling for any reason to perform its duties as Administrative Agent/Indenture Trustee with respect to all or any portion of a Funding Pool, fees for any replacement Administrative Agent/indenture Trustee may be paid from funds held in the Expense Reserve Account.

Custodial Fees: In addition to Administrative Fees, a fee (e.g., $500 per month) may be paid monthly by the Manager.

Manager Fee: A fee (e.g., a one-time fee) may be paid to the Manager with respect to each Funding on the applicable Funding Date.

Other Transaction Expenses: Other applicable transaction expenses may be applied as appropriate.

Reference will now be made to certain example legal and other considerations relating to risk factors related to the purchase of Funding Certificates. Of note, these example legal and other considerations are intended to be illustrative and not restrictive (e.g., all dates, times, values, etc. are intended to be illustrative and not restrictive).

Absence of Secondary Market Could Limit Ability to Resell Certificates: A holder may be unable to resell certificates due to the absence of a secondary market for them. If a secondary market for the certificates does develop, it may not continue or it may not be sufficiently liquid to allow resale of certificates. There may be no current market for the Funding Certificates. Although the Initial Purchaser may from time to time make a market in any Funding Certificates, the Initial Purchaser may be under no obligation to do so. If the Initial Purchaser commences any market-making, it may discontinue the same at any time. In addition, the Funding Certificates may be subject to certain transfer restrictions and may only be transferable to transferees that meet the requirements to be a Qualified Institutional Buyer and a Qualified Purchaser. Consequently, the certificates may need to be held for an indefinite period of time or until their final maturity.

Transfer Restrictions May Limit Available Purchasers of Certificates: The number of possible purchasers of certificates may be limited as a result of transfer restrictions on the certificates. Because the offering and the certificates may not have been registered under the Securities Act, or any state securities laws, the certificates may be resalable only in transactions exempt from the Securities Act and any applicable state securities laws. The certificates may be resalable only to persons who complete and deliver an investor letter and can represent that they are both (a) "qualified purchasers" under the Investment Company Act of 1940, as amended ("Qualified Purchasers"), and (b) "qualified institutional buyers" as defined in Rule 144A under the Securities Act ("Qualified Institutional Buyers") and/or to other institutional "accredited investors" as defined in Rule 501(a)(1), (2), (3) or (7) of Regulation D of the Securities Act.

Limited-Recourse Obligations: The Funding Certificates of each Issuer may be limited-recourse obligations of that Issuer. The Funding Certificates may be payable solely from the assets owned by that Issuer. None of the security holders, members, officers, directors, managers or incorporators of the Issuer, the Manager, the Sponsor, the Administrative Agent/Indenture Trustee, any Rating Agency, the Initial Purchaser, any of their respective affiliates or any other person or entity may necessarily be obligated to make payments on the Funding Certificates. Consequently, the holders may need to rely solely on amounts received in respect of each Funding Pool for the payment of principal thereof and interest thereon. Although substantially all of the assets held by any Issuer may be composed of certificates of deposit that are expected to be insured by the FDIC, there can be no assurance that the distributions will be sufficient to make payment in full on any Funding Certificate. If proceeds of assets of any Issuer are insufficient to make payments on the Funding Certificates, no other assets may be available for payment of the deficiency and, following liquidation of all such assets, the obligations of the Issuer to pay such deficiencies may be extinguished.

Yield Considerations: The yield to each holder of a Funding Certificate may be a function of the purchase price paid by such holder for its Funding Certificate and the timing and amount of interest and principal distributions made in respect of such Funding Certificate during the term a Funding Certificate is outstanding. Each prospective purchaser of a Funding Certificate should make its own evaluation of the yield that it expects to receive on its Certificate. Prospective investors should be aware that the timing and amount of interest and principal distributions may be affected by, among other things, the performance of the CDs held in a Funding Pool. The CDs may not be renewable at their Stated Maturity Date and interest (if any) may cease to accrue at the Stated Maturity Date for CDs held in a Funding Pool.

No Right of Redemption for Funding Certificates: No certificate holder of any Funding Certificate may necessarily have the right to require any Issuer to liquidate any of its assets prior to the stated maturity date for that Funding Certificate. Unlike a time deposit held directly with a bank, which may permit a depositor to withdraw principal prior to the maturity date at a penalty, each Issuer may be contractually prohibited from withdrawing any principal of any CD held in its Funding Pool prior to the CD Maturity Date for that Funding Pool, unless required to do so by law. Thus, even if a Funding Certificate holder had some basis to demand an early redemption of its Funding Certificate, an Issuer may have no legal right to liquidate any of its assets held in its Funding Pool to enable it to redeem any Funding Certificate. Generally, other than in connection with CD Proceeds arising as a consequence of the conservatorship or receivership of a Seller Bank, there may be no events or circumstances that will trigger any prepayment of any principal on any of the Funding Certificates. Thus, holders of Funding Certificates may need to be prepared to wait until the maturity date of the Funding Certificate for repayment of principal amounts, especially because there can be no assurance of the availability of any secondary market for any Funding Certificates. See "Early Distributions on Offered Funding Certificates; Lack of Eligible Proceeds Investments."

Early Distributions on Funding Certificates; Lack of Eligible Proceeds Investments: There may be a limited number of circumstances in which an Issuer may be entitled to prepay its Funding Certificates, in whole or in part, although any partial redemption may need to be made on a pro rata basis equally among all Funding Certificates. Other than with respect to amounts held in any reserve account, any cash received by an Issuer may need to be either invested in Eligible Proceeds Investments or distributed to its Funding Certificate Holders on the next Payment Date, as provided in its Indenture. To be an Eligible Proceeds Investment, among other things, the annualized yield of such Investment may need to be equal to or greater than the annualized yield of CDs held in the Funding Pool of that Issuer as established on the Funding Date for that Issuer. There can be no assurance that any Issuer will be able to make Eligible Proceeds Investments of any funds at any time, which may require that Issuer to distribute those funds to its Certificate Holders by no later than the next Payment Date. An Issuer may receive a principal payment of any CD held in its Funding Pool prior to the final maturity date of that CD, for example as proceeds of FDIC insurance following the appointment of the FDIC as conservator or receiver for any insolvent Seller Bank. The FDIC as conservator or receiver of an insolvent Seller Bank may be entitled to transfer to another insured depository institution any of the insolvent institutions assets and liabilities, including obligations such as the CDs, without approval or consent of the holder of the CDs. Purchasers should be aware that a conservator or receiver for a federally insured institution, and depository institutions assuming a failed institution's deposits, may reduce the interest rate (or earned discount) on, or otherwise change the terms of, outstanding deposit accounts. No such action may necessarily, however, affect interest accrued or discount earned prior to the date such action is taken. In such circumstance the Issuer may be required to accept payment on account of the affected CD and would likely be unable to find any Eligible Proceeds Investment for those proceeds. Any such actions could adversely affect the yield on Funding Certificates of Issuers affected thereby.

Mismatch of Payments and the Time Value of Money: The Payment Date for payment by the Indenture Trustee with respect to any proceeds of interest or principal payments received on account of CDs held in any Funding Pool may not necessarily occur until, for example, five (5) business days following the CD Payment Date, which is the date on which principal and interest is due from Seller Banks with respect to their respect CDs. During the period from the CD Payment until the Payment Date, fiends held by the Indenture Trustee may not necessarily accrue interest for the benefit of the Holders of the Funding Certificates. (Any interest accrued during this period may inure to the benefit of the Indenture Trustee, which may have taken this into account in determining its fees). In addition, if the Escrow Agent is unable for any reason to purchase CDs on any date scheduled as a Funding Date, the Escrow Agent may have, for example, three (3) business days to effect that purchase before it may be obligated to return funds, pro rata, to prospective purchasers of Funding Certificates for the Funding Pool. Depending upon the frequency and amounts of interest payments on CDs held in a Funding Pool, and any delay that could occur in the purchase of all CDs to be held in a Funding Pool, a Holder of a Funding Certificate may lose the time value of money during such periods. Any such delays may need to be taken into account when determining the yield expected with respect to any Funding Certificate.

Credit Ratings: Any credit ratings of any of the Funding Certificates represent that Rating Agency's opinion regarding the credit quality of those Funding Certificates and are not a guaranty of quality. Rating agencies may attempt to evaluate the safety of principal and interest payments and do not necessarily evaluate the risks of fluctuations in market value, therefore, they may not fully reflect the true risks of an investment. Also, Rating Agencies may fail to make timely changes in credit ratings in response to subsequent events, so that an Issuer's current financial condition may be better or worse than a rating indicates.

FDIC Insurance and Insolvent Seller Banks: All principal and all interest amounts to the stated Final Maturity Date of each of the CDs held in any Funding Pool may be intended to be covered by federal deposit insurance provided by the Bank Insurance Fund administered by FDIC and backed by the full faith and credit of the United States Government, in the maximum amount permitted by law from time to time (currently $100,000). This insurance coverage limit may apply to the CDs issued by any Seller Bank aggregated with all other deposits maintained by an Issuer engaged in independent activity in the same legal capacity with that Seller Bank. Each Issuer may be precluded by the terms of its Operating Agreement from acquiring any CDs from or otherwise holding any funds in any deposit account with any Seller Bank in excess of the $100,000 maximum insured amount. If the FDIC is appointed as conservator or receiver for any Seller Bank, the FDIC is authorized to disaffirm or repudiate any contract or lease to which that Seller Bank is a party, the performance of which is determined to be burdensome, and the disaffirmance or repudiation of which is determined to promote the orderly administration of that Seller Bank's affairs. It appears very likely that for this purpose debt obligations, such as the CDs, are "contracts" within the meaning of the foregoing and that the CDs may be repudiated by the FDIC in its capacity as conservator or receiver of the Bank Such repudiation may result in a claim of the holder of the CDs against the conservator or receivership for the principal of the CDs and interest accrued to the date of such repudiation. In that case, an Issuer may be required to follow the FDIC's claims procedures, which may result in a delay in receiving payment.

FDIC Staff Assurances: The Manager and others may receive assurances in writing from the legal staff of the FDIC regarding the availability of FDIC insurance for CDs held by an Issuer in its name from a Seller Bank (the "FDIC Letter"). The FDIC issues formal interpretations of its rules, but only pursuant to rule-making proceedings. Unlike SEC "no-action" letters or IRS "private letter" rulings, the FDIC does not issue formal interpretations in the form of letters or rulings on specific cases. It is believed that the FDIC Letter is the strongest authority available from the FDIC for the positions expressed therein. However, in the event of any challenge to the availability of FDIC insurance to any Issuer, the FDIC Letter may not carry the force of legal precedent that would be binding on a court so as to foreclose a view by the FDIC contrary to that set forth in an FDIC Letter.

Investment Company Act: No Issuer and no Funding Pool may necessarily be registered nor may any Issuer or any Funding Pool expect to register, with the United States Securities and Exchange Commission (the "SEC") as an investment company pursuant to the Investment Company Act. Each Issuer and each Funding Pool may not so registered and may not expect to so register in reliance on applicable exceptions set forth in the Investment Company Act of 1940 (the "Investment Company Act"). Section 3(c)(7) of the Investment Company Act excludes from regulation under the Investment Company Act entities whose outstanding securities are owned exclusively by persons who are, at the time they acquire the securities, Qualified Purchasers, if the issuer does not make and does not propose to make a public offering of those securities. Section 3(c)(7) and Rule 2a51-1 under the Investment Company Act require that the issuer (or a person designated by the issuer for such purpose) reasonably believes believe at all times that the holders of the issuer's securities are persons who, at the time of their acquisition of the securities, are Qualified Purchasers. Thus, each Issuer, or its Manager or other person designated by the Issuer, may be required to have a reasonable believe of compliance for the life of that Issuer's Funding Certificates, not just at the time of the initial transfer. Trading in the secondary market for Funding Certificates may settle on a book-entry basis through DTC, which may make it more difficult for an Issuer or its designee for such purpose to acquire and maintain information about the holders of the Funding Certificates. No Issuer may necessarily request a no-action letter from the SEC regarding the Investment Company Act, and it is believed that to date, the SEC has declined to confirm that procedures for resales of securities in the 144A market would be adequate for purposes of the Investment Company Act, or otherwise to provide safe harbors for issuers relying on a 3(c)(7) exemption. Each Issuer may be expected to follow procedures that it believes will provide it with a reasonable basis to conclude that the holders of its Funding Certificates are Qualified Purchasers under the Investment Company Act, including those procedures adopted by DTC with respect to 3(c)(7) securities to enable issuers to establish the requisite reasonable belief that all of the holders of the Funding Certificates are Qualified purchasers notwithstanding the deposit of those securities in DTC. Each transferee of a beneficial interest in a Funding Certificate may be required to represent at the time to purchase that: (i) the purchaser is both a Qualified Institutional Buyer and a Qualified Purchaser; (ii) the purchaser is not a dealer described in paragraph (a)(1)(ii) of Rule 144A unless such purchaser owns and invests on a discretionary basis at least U.S. $25,000,000 in securities of issuers that are not affiliated persons of the dealer; and (iii) the purchaser is not a plan referred to in paragraph (a)(1)(i)(D) or (a)(1)(i)(E) of Rule 144A, or a trust fund referred to in paragraph (a)(1)(i)(F) of Rule 144A that holds the assets of such a plan, unless investment decisions with respect to the plan are made solely by the fiduciary, trustee or sponsor of such plan; and (iv) the purchaser will provide written notice of the foregoing, and of any applicable restrictions on transfer, to any transferee prior to any transfer of its Funding Certificate. The Indenture may provide that if, notwithstanding the restrictions on transfer contained therein, an Issuer determines that any beneficial owner of a Funding Certificate (or any interest therein) is not both a Qualified Purchaser and a Qualified Institutional Buyer (unless such beneficial owner is an Institutional Accredited Investor that purchased such Funding Certificate or interest therein directly from the Initial Purchaser), then the Issuer may require, by notice to such Holder, that such Holder sell all of its right, title and interest to such Funding Certificate (or any interest therein) to a person that is both a Qualified Institutional Buyer and a Qualified Purchaser, with such sale to be effected within, for example, 30 days after notice of such sale requirement is given. If such beneficial owner fails to effect the transfer required within such period, (a) upon direction from the Manager or the Issuer, the Manager, on behalf of and at the expense of the Issuer, may cause such beneficial owner's interest in such Funding Certificate to be transferred in a commercially reasonable sale (e.g., conducted by the Manager in accordance with Section 9-310(b) of the Uniform Commercial Code as in effect in the State of New York as applied to securities that are sold on a recognized market or that may decline speedily in value) to a person that certifies to the Indenture Trustee, the Issuer and the Manager, in connection with such transfer, that such person is a both (i) a Qualified Institutional Buyer and (ii) a Qualified Purchaser and (b) pending such transfer, no further payments will be made in respect of such Funding Certificate held by such beneficial owner. There can be no assurance that all of the procedures adopted by an Issuer to assure its reasonable believe regarding the status of holders of its Funding Certificates will be followed in all instances or will adequate if challenged. If the SEC or a court of competent jurisdiction were to find that an Issuer or a Funding Pool is required, but in violation of the Investment Company Act had failed, to register as an investment company, possible consequences include, but are not limited to, the following: (i) the SEC could apply to a district court to enjoin the violation; (ii) investors in the Issuer could sue the Issuer and recover any damages caused by the violation; and (iii) any contract to which the Issuer is a party that is made in, or whose performance involves a, violation of the Investment Company Act may be unenforceable by any party to the contract unless a court were to find that under the circumstances enforcement would produce a more equitable result than nonenforcement and would not be inconsistent with the purposes of the Investment Company Act. Should an Issuer or any Funding Pool be subjected to any or all of the foregoing, that Issuer and that Funding Pool may be materially and adversely affected.

No Physical Delivery of Offered Funding Certificates to Holders: No individual Funding Certificate may necessarily be issued in physical form by any Issuer directly to any purchaser or owner of the Funding Certificate. Instead, the Issuer may issue a "master" Funding Certificate, evidencing all Funding Certificates of that Issuer, to, for example, a nominee of The Depository Trust Company ("DTC"), currently at 55 Water Street, New York, N.Y., which may act as custodian for, and maintain records evidencing, the aggregate amount of such Funding Certificates held for customers of, the Initial Purchaser and certain other broker-dealers. In turn, the Initial Purchaser, acting as nominee, authorized representative, agent or custodian, may maintain records evidencing ownership of the Funding Certificates are purchased in book-entry (i.e., non-physical form) only, and may provide a holder with a confirmation statement and periodic account statements reflecting such purchase, which should be retained for the holder's records. By reason of the foregoing limitations, the Funding Certificates may not be an appropriate investment for persons wishing to take possession of a physical certificate evidencing their Funding Certificate. If a holder chooses to remove the Initial Purchaser as the agent or custodian with respect to a Funding Certificate, the holder may: (i) transfer the Funding Certificate to another agent provided that the agent is a member of DTC (most major brokerage firms are members; many banks and savings institutions are not); or (ii) request that ownership of the Funding Certificate be evidenced directly on the books of the Issuer, subject to applicable law and the Issuer's terms and conditions, including those related to the manner of evidencing Funding Certificate ownership. If a holder chooses to remove the Initial Purchaser as agent, the Initial Purchaser may have no further responsibility for payments made with respect to the Funding Certificate. A Funding Certificate established directly on the books of the Issuer may not be readily transferable.

Money Laundering Prevention: The "Uniting and Strengthening America by Providing Appropriate Tools Required to Intercept and Obstruct Terrorism Act of 2001" (the "USA PATRIOT Act"), effective as of Oct. 26, 2001, requires broker-dealers registered with the Securities and Exchange Commission and the National Association of Securities Dealers (the "NASD") to establish and maintain anti-money laundering programs. With respect to the content of those programs, the NASD has enacted a rule that requires broker-dealers to establish and maintain anti-money laundering programs similar to those currently in place at U.S. banks. On Sep. 26, 2002, the Treasury Department published proposed regulations that will, if enacted in their current form, force all "unregistered investment companies" to: (a) establish and maintain an anti-money laundering compliance program; (b) periodically "test" the required compliance program; (c) designate and train responsible personnel; and (d) file a written notice with the Treasury Department within 90 days of the effective date of the regulations that identifies certain information regarding the subject company, including the dollar amount of assets under company management and the number of interest holders in the subject company. It is believed that as the proposed rule is currently drafted, an "unregistered investment company" includes any issuer that: (i) would be an investment company but for the exclusion from registration provided for by Section 3(c)(7) of the Investment Company Act; (ii) permits an owner to redeem his or her ownership interest within two years of the purchase of that interest; (iii) has total assets over $1,000,000; and (iv) is organized in the United States or is "organized, operated, or sponsored" by a U.S. person. It may be anticipated that no Issuer will issue any Funding Certificates that will have a Final Maturity Date that is earlier than two years after the initial purchase of those Funding Certificates. No holder of a Funding Certificate may necessarily have any right of redemption with respect to any portion of its Funding Certificate prior to the Final Maturity Date. Pending further clarification by the Treasury Department, each Issuer may take the view that it does not fall under the ambit of the proposed rule under the USA PATRIOT ACT. Thus, no Issuer may necessarily comply with the requirements of the USA PATRIOT ACT. It is possible that other legislation or regulations could be promulgated that will require compliance by an Issuer with information gathering and reporting and other obligations, and as well as to require the Manager, the Administrative Agent/Indenture Trustee or other service providers to any Issuer to share information with governmental authorities with respect to investors in the Funding Certificates in connection with the establishment of anti-money laundering procedures. In addition, it is possible that such rule or regulations would require an Issuer to implement additional restrictions on the transfer of the Funding Certificates. Material and adverse consequences for any Issuer could occur if it were subject to the requirements of the USA PATRIOT ACT and either had failed to comply with it or were required to commence compliance. Similarly, application of the information sharing requirements or could increase the transaction costs. Additional transfer restrictions could further limit the marketability of Funding Certificates in the secondary market.

Market Uncertainty: Many factors can create market uncertainty, including, but not limited to, the risk of terrorist action and war, which could cause significant uncertainty with respect to global markets and could have a material effect on general economic conditions, consumer confidence and market liquidity. A negative impact on economic fundamentals and consumer confidence may likely increase market volatility, cause credit spreads to widen and reduce liquidity, all of which could have a material adverse effect on the performance of the Funding Certificates. No one can predict with certainty how the market will react to any particular event, nor can anyone predict whether interest rates will rise or fall. Any market or interest rate volatility may reduce the marketability of the Funding Certificates.

Projections, Forecasts and Estimates: Any projections, forecasts and estimates contained herein maybe forward looking statements and may be based upon certain assumptions that the Issuers consider reasonable. Projections may be necessary speculative in nature, and it can be expected that some or all of the assumptions underlying the projections may not materialize or will vary significantly from actual results. Accordingly, the projections maybe only an estimate. Actual results may vary from the projections, and the variations may be material. Some important factors that could cause actual results to differ materially from those in any forward looking statements include changes in interest rates, market, financial or legal uncertainties, the timing of acquisitions of CDs to be held in any Funding Pool, mismatches between the timing of accrual and receipt of proceeds from the CDs to be held in any Funding Pool or payments to holders of the Funding Certificates. Consequently, the inclusions of projections herein should not necessarily be regarded as a representation by any Issuer, the Manager, the Sponsor, the Initial Purchaser or any of their respective affiliates or any other person or entity of the results that will actually be achieved by an Issuer. None of the Issuer, the Manager, the Initial Purchaser, any of their respective affiliates or any other person may have any obligation to update or otherwise revise any projections, including any revisions to reflect changes in economic conditions or other circumstances arising after the date hereof or to reflect the occurrence of unanticipated events, even if the underlying assumptions do not come to fruition.

Reference will now be made to an example "Participation Agreement For Capital Market CD Program" (hereinafter "Participation Agreement"). Of note, this example Participation Agreement may be made and entered into by and between a Facilitator (e.g., a Applicable state (e.g. Colorado, Delaware) limited liability company), on behalf of itself and each of one or more Issuers, and the Bank signing the Participation Agreement (of course, two or more Participation Agreements may be entered into with two or more Banks). Of further note, this example is intended to be illustrative and not restrictive. In any case, the example Participation agreement may include the following:

Recitals

The Capital Market CD Program (the "Program") may be administered by the Facilitator (which may be, for example, a wholly owned subsidiary of another entity).

The Facilitator may form a separate limited liability company (the "Issuer") for each funding. Each Issuer may prepare and distribute to banks participating in the Program an offer (the "Offer") to purchase certificates of deposit ("CDs"). The Offer may be sent (e.g., by e-mail and/or by being electronically posted to a Website or other appropriate mechanism) to participating banks and may contain all of the terms and conditions of the CDs to be purchased for that funding, including, but not limited to, the term and principal amount of the CD and the method for determining the interest rate.

Terms and Conditions

1. Concurrent with execution of this Agreement, Bank may need to complete a "CMCD Contact Information" form containing the names, e-mail addresses and other contact information of its authorized personnel (the "Authorized Representatives") to both receive Offer(s) from Issuer(s) under the Program and accept or reject such Offer(s) on behalf of the Bank. Each Offer from an Issuer may be sent to the appropriate e-mail addresses and/or posted as described above. The Offer may have a link to the Website where the Bank can accept or reject an Offer. To access the Website, the Bank may be issued an account number and password. If the Bank accepts an Offer on the Website, the Bank's Authorized Representatives may be sent an automatically generated e-mail acknowledgment of the Bank's acceptance of the Offer. On the settlement date (e.g., which may be one business day prior to the date the CD is issued), the Issuer may send a confirmation e-mail (the "Confirmation") to the Authorized Representatives confirming all of the final terms of the CD to be issued (which final terms may be in accordance with the terms set forth in the Offer). The Bank's acceptance of an Offer on the Website within the time period indicated in the Offer may constitute an irrevocable, legally binding commitment from the Bank to issue a CD to the Issuer containing the final terms and conditions set forth in the Confirmation, subject only to the Bank's receipt of an ACH payment in an amount equal to the purchase price of the CD, net of any prepaid interest, all as indicated in the Confirmation (the "ACH Payment"). The Bank may be permitted to only accept or reject the Offer and may not necessarily be permitted to modify the Offer in any manner. The Bank may reject an Offer (e.g., on the Website) to create an electronic record of such rejection. However, the Offer may also be deemed rejected if the Bank does not affirmatively accept the Offer (e.g., on the Website) within the time period indicated in the Offer.

2. All CD's issued under the Program may contain all of the terms and conditions of the Confirmation and the additional terms and conditions set forth in an appropriate "CD Form" (which may be an exhibit attached to the Participation Agreement). The CD may be automatically issued at the moment the Bank receives the ACH Payment from the escrow agent, administrator and custodian for the Program (the "Administrator"). In the event the current Administrator is replaced, the Facilitator may provide notice of such replacement and the effective date by e-mail to the Authorized Representatives of the Bank and/or post such information on the Website. The CD issued by the Bank may be in book entry form only and an actual written CD document may not necessarily be issued. No later than one business day (for example) following receipt of the ACH Payment, the Bank may need to clearly mark its books and records to reflect the issuance of the CD to the Issuer (e.g., in the exact name of the Issuer indicated in the Confirmation) and that the CD has all of the terms and conditions set forth in the Confirmation and CD Form. The parties may agree that the record of the ACH Payment shall constitute a receipt issued by the Bank for the purchase of the CD and may be conclusive and binding on the parties that a CD has been issued in the name of the Issuer and that the CD incorporates all of the terms and conditions of the Confirmation and CD Form.

3. In the event that a funding is oversubscribed by banks participating in the Program, the Issuer may elect to decline to purchase CDs from banks that have accepted an Offer (including the Bank) by notifying such banks (e.g., by e-mail to the Authorized Representative) that the Issuer is electing not to purchase a CD. In such event, the Bank's commitment to issue the affected CD and the Issuer's commitment to purchase such CD may terminate without liability to either party. If oversubscribed fundings become more common, the Facilitator may resolve such issue by rotating the banks who receive Offers from Issuer in order to eliminate or minimize the situation where an Issuer declines to purchase CDs from banks that have accepted Offers.

4. The Bank may authorize the Administrator for the Program to initiate ACH transfers for all interest and principal payments due on any CDs issued by the Bank to Issuer(s) under the Program. The ACH transfer may be made effective as of the due date for any interest or principal payment (or, if the due date falls on a non-banking day, on the next succeeding business day). The CMCD Contact Information may set forth the Bank's ACH information necessary for the Administrator to initiate ACH transfers from the Bank's funds. Following execution of this Agreement, the Administrator may contact an Authorized Representative of the Bank to initiate and carry out test ACH transfers between the Administrator and the Bank. The test ACH transfers may need to be successfully completed before the Bank can accept any Offers under the Program.

5. The Bank may be solely responsible for safeguarding its account number and password information to access the Website and accept or reject Offers. The Bank may need to immediately notify the Facilitator (e.g., orally followed by confirmation in writing) if any of the following shall occur: (1) the loss or theft of the Bank's account number or password; (2) the receipt of a Confirmation for an Order that the Bank's Authorized Representatives did not accept; or (3) if the Bank becomes aware of any unauthorized use of its account number or password. Following receipt of such notice, the Facilitator may cancel the Bank's account number and password and reissue a new account number and password to the Bank's Authorized Representatives (which new account number and password, and any Offers made and accepted following the issuance thereof, may be governed by all of the terms of this Agreement). Any Offers accepted through the Website prior to the Facilitator's receipt of the Bank's notice may be legally binding on the Bank.

6. The Bank may modify the information set forth in the CMCD Contact Information by providing a new, completed copy of the CMCD Contact Information to the Facilitator and Administrator, duly executed and dated by the Bank. The most recently dated copy of a completed and executed CMCD Contact Information in the Facilitator's records may be the effective and legally binding document on the parties and may supersede any CMCD Contact Information with a date prior thereto.

7. Effective upon execution of this Agreement and as of the date of each Confirmation for an Offer accepted under the Program, the Bank may need to represent and warrant to the Facilitator and each Issuer the following:

Bank is: (i) a federal, state or District of Columbia chartered depository institution, whether or not a member of the Federal Reserve System, the deposits of which are FDIC insured under federal law; and (ii) categorized as "well capitalized" under the FDIC Improvement Act of 1991.

Bank is duly organized, validly existing and in good standing under the laws of its jurisdiction of organization.

Bank has all requisite power and authority to execute, deliver and perform this Agreement and any CD issued under the Program, and to consummate the transactions contemplated hereby and thereby. The execution, delivery and performance of this Agreement and any CD issued under the Program, and the consummation of the transactions contemplated hereby and thereby, have been duly and validly authorized by all necessary action on the part of Bank. This Agreement and any CD issued under the Program have been duly executed and delivered by Bank and constitute its legal, valid and binding obligation, enforceable against Bank in accordance with their terms.

The execution, delivery and performance of this Agreement and any CD issued under the Program and the consummation by Bank of the transactions contemplated hereby and thereby will not: (a) require the consent, license, permit, waiver, approval, authorization or other action of, by or with respect to, or registration, declaration or filing with, any governmental authority or any other person; or (b) violate or conflict with any provision of the organizational documents of Bank or any agreement to which the Bank is a party.

8. The Facilitator, the Issuer(s) and the Administrator may not be responsible for the accessibility of, transmission quality, outages to, or malfunction of any telephone circuits, computer system or software, or the Internet. The Bank may be responsible for providing and maintaining the communications equipment, including personal computers and modems required for accessing the Website. The Facilitator may reserve the right to suspend service and deny access to the Website, without prior notice, during scheduled or unscheduled system maintenance, repairs or upgrades.

9. The Facilitator, the Issuer(s) and the Administrator may not be liable for loss caused directly or indirectly by any government restriction, or any "force majeure" (e.g., flood, extraordinary weather conditions, earthquake or other act of God, fire, war, insurrection, riot, communications or power failure, equipment or software malfunction) or any other cause beyond the reasonable control of the Facilitator, any Issuer or the Administrator.

10. Facilitator may reserve the right at any time to amend, change, revise, add, or modify the terms and conditions set forth in this Agreement upon 30 days prior notice (for example) to the Bank (delivered electronically or otherwise). The Bank's continued use of the Website after the amendments, changes or modifications to these terms and conditions are delivered to the Bank may constitute the Bank's agreement to be bound by such amendments, changes or modifications. Facilitator and the Issuer(s) may justifiably rely upon such use of the Website as evidence of the acceptance of any such amendments, changes or modifications. Facilitator and the Issuer(s) may not necessarily be bound by any verbal statements that seek to amend the terms and conditions set forth in this Agreement or any other written amendment that is not executed by the Facilitator. Facilitator and the Issuer(s) may further disclaim any and all implied warranties of merchantability or fitness for a particular purpose with regard to any aspect of the Program or Website.

11. This Agreement may be terminated by either party upon 30 days (for example) prior written notice to the other party. Upon termination under the foregoing sentence or otherwise, the following may apply:

Bank may no longer be permitted to access its account or accept any Offers under the Program; and, This Agreement and all representations, warranties and other provisions contained hereunder may survive such termination and continue to apply to all Offers accepted and CD's issued by Bank prior to termination.

12. This Agreement may inure to the benefit of Facilitator and all Issuer(s) and be binding upon the Bank and its successors and assigns.

13. The Website and all content or information provided by the Facilitator or the Issuer(s) on the Website or otherwise, and the manner of the provision of the services, individually or as a whole, may be protected pursuant to U.S. patent laws, copyright laws, trade secret laws, international treaties or conventions and/or other laws, and may remain the exclusive property of the Facilitator (and/or any parent entity) and/or the Issuer(s), and no title or ownership interest may necessarily transfer to the Bank. The use of the Website may be provided to Bank for use solely with the Program in accordance with this Agreement, and Bank may agree not to modify, print, copy, publish, transmit, license, participate in the transfer or sale of, reproduce, create derivative works from, distribute, redistribute, perform, display or in any way exploit or use the Website, its content or any feature thereof. Facilitator may reserve the right at any time, in its discretion and without prior notice to Bank, to change, revise, modify, add, upgrade, remove or discontinue the Website or any content or information related thereto. Facilitator may also impose limitations or restrictions upon and may revoke Bank's access to and use of the Website or any content or information related thereto, in whole or in part, without prior notice.

14. There may be no assurance that the Facilitator or Issuer(s) will submit any minimum number of Offers in connection with the Program. The Facilitator may also discontinue making any further Offers at anytime.

15. This Agreement may be governed by and construed, for example (which example is intended to be illustrative and not restrictive), in accordance with Colorado law (without reference to its conflict of law provisions).

Reference will now be made to an example "Form Of CD" document which may be used in conjunction with the Participation Agreement discussed above. Of note, this example Form Of CD is intended to be illustrative and not restrictive. In any case, the example Form Of CD may include the following:

This Time Certificate of Deposit ("CD") may be issued pursuant to all of the terms and conditions of the Participation Agreement for the Capital Market CD Program, as amended from time to time (the "Participation Agreement"). Capitalized terms used herein that are not otherwise defined herein may have the meaning given such terms under the Participation Agreement.

Each CD issued under the Participation Agreement may have the terms set forth in the Confirmation issued for such CD and the following additional terms and conditions:

1. The issue date of the CD may be the date stipulated on the confirmation. The principal amount of the CD may be the sum of the ACH Payment plus any prepaid interest or other amounts offset against the purchase price of the CD, all as reflected in the Confirmation.
2. The CD may be issued in the name of the Issuer set forth in the Confirmation. Bank may need to mark its books and records to reflect the issuance of the CD to the Issuer (e.g., in the exact name of the Issuer indicated in the Confirmation).
3. Interest may accrue on the principal balance of the CD at the rate set forth in the Confirmation using, for example, a 360 day year. Accrued interest may be paid (e.g., semiannually) in accordance with the schedule set forth in the Confirmation,
4. The CD may be issued in book entry form only and a written certificate of deposit may not necessarily be issued. The ACH Payment may constitute a receipt and acknowledgement issued by the Bank for the purchase of the CD.
5. All payments of accrued interest and principal may be made by ACH transfer in accordance with the Participation Agreement.
6. The CD may be non-negotiable and may be not renewable. There may be no early redemption feature.
7. Payments hereunder that are due on a non-banking day may be made on the next banking day.

In another embodiment the present invention may provide an automated order entry and clearing platform hereinafter sometimes referred to as the "Exchange") to facilitate banking transactions (e.g., wholesale banking transactions) among participating parties (e.g., participating financial institutions).

In one example (which example is intended to be illustrative and not restrictive), the banking transactions may relate to CD's, commercial paper, municipal bonds, and/or government agencies).

In another example (which example is intended to be illustrative and not restrictive), the participating parties may include, but not be limited to: banks; S&L's; credit unions; brokerage firms (e.g., major brokerage firms); corporations (e.g., major corporations); state & local municipalities; other financial institutions (e.g., insurance companies, trust companies, etc.).

Of note, the Exchange of the present invention may allow financial institutions to have a centralized, secure and controlled marketplace to execute, settle and clear banking transactions (e.g., wholesale banking transactions).

Of further note, the Exchange of the present invention may benefit financial institutions (e.g., community-based financial institutions) as follows:

Immediate access to liquidity never before available in one place;

Ability to make short-term loans (purchase CP) directly (e.g., to the top corporate names in America);

Automated and seamless order execution, settlement and clearing never before available;

Most competitive pricing and comprehensive market coverage available in one central marketplace;

Operated by a top financial transaction technology provider firm.

Referring now to certain operational issues involving the Exchange of the present invention, it is noted that:

Order Execution. All orders may be executed "online" through the Exchange's automated order entry platform. All transactions may be binding on both the Buyer and the Seller.

Transaction Settlement. All transactions may settle in electronic format (e.g., the next day). Confirmations may be provided electronically each day at the close of the Exchange (e.g., 4PM EST).

Clearing. All transactions (debts or credits as a result of purchase/sale, interest payments, maturities) may settle through the customer's clearing account (e.g., which clearing account may be administered by an appropriate entity).

Referring now to FIG. 1, one specific example (which example is intended to be illustrative and not restrictive) of certain steps carried out in a transaction involving the Exchange of the present invention is shown. Of course, one or more other steps may be added, one or more identified steps may be deleted and/or the steps may be carried out in another order. In any case, as seen in this FIG. 1, the steps may include the following:

Step 1: An Investor/Buyer (hereinafter simply "Buyer" for the purposes of this example) logs into the system.

Step 2: Buyer enters order to purchase CD's (including, for example, rate/term/settlement date).

Step 3: An Issuer/Seller (any participating financial institution but hereinafter simply "Bank" for the purposes of this example) logs into the system.

Step 4: Bank chooses which issues to participate in (in one example, all orders may be for $100 k).

Step 5: Confirmation is created when sale is made.

Step 6: Confirmation is created when purchase is made.

Step 7: Transaction details forwarded to Trustee (e.g., on closing date prior to settlement date).

Step 8: Underwriter sends funds (e.g., by wire) to Trustee (e.g., on settlement date).

Step 9: Trustee delivers securities to DTC.

Step 10: Trustee credits Bank's clearing account.

Step 11: Trustee credits Exchange Operator's account (and/or the account of any other desired entity) for transaction.

Figure 2:
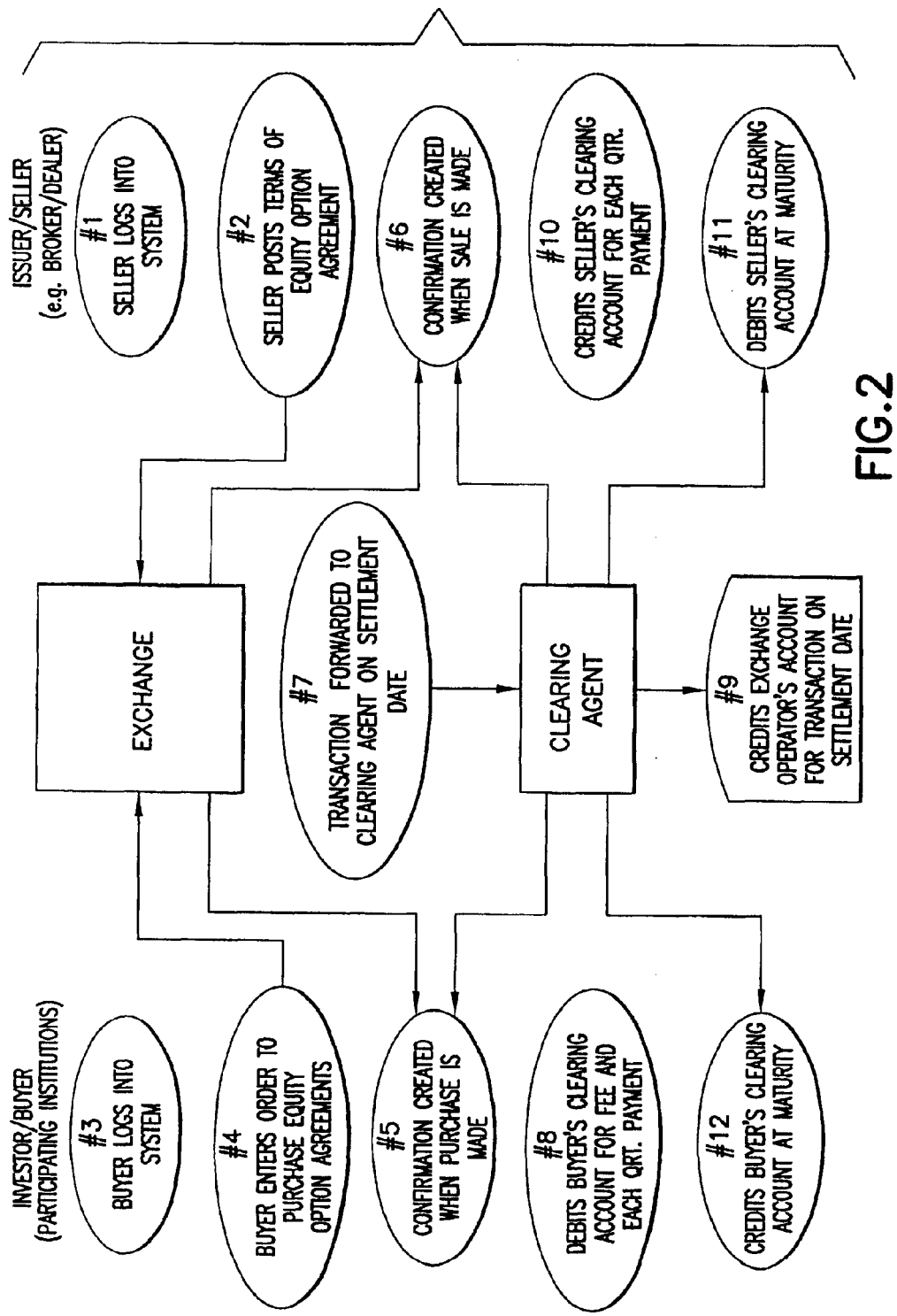
FIG. 2 shows a block diagram of certain steps carried out according to another embodiment of the present invention.

Referring now to FIG. 2, another specific example (which example is intended to be illustrative and not restrictive) of certain steps carried out in a transaction involving the Exchange of the present invention is shown. Of course, one or more other steps may be added, one or more identified steps may be deleted and/or the steps may be carried out in another order.

In any case, as seen in this FIG. 2, the steps may include the following:

Step 1: An Issuer/Seller (e.g., a Broker/Dealer, hereinafter simply "Seller" for the purposes of this example) logs into the system.

Step 2: Seller posts terms of equity option agreement (for example).

Step 3: An Investor/Buyer (any participating financial institution but hereinafter simply "Buyer" for the purposes of this example) logs into the system.

Step 4: Buyer enters order to purchase the equity option agreement.

Step 5: Confirmation is created when purchase is made.

Step 6: Confirmation is created when sale is made.

Step 7: Transaction details forwarded to Clearing Agent (e.g., on settlement date).

Step 8: Clearing Agent debits Buyer's clearing account (e.g., for Exchange Fee and each quarterly payment).

Step 9: Clearing Agent credits Exchange Operator's account (and/or the account of any other desired entity) for transaction (e.g., on settlement date).

Step 10: Clearing Agent credits Seller's clearing account for each quarterly payment.

Step 11: Clearing Agent debits Seller's clearing account at maturity.

Step 12: Clearing Agent credits Buyer's clearing account at maturity.

Figure 3:
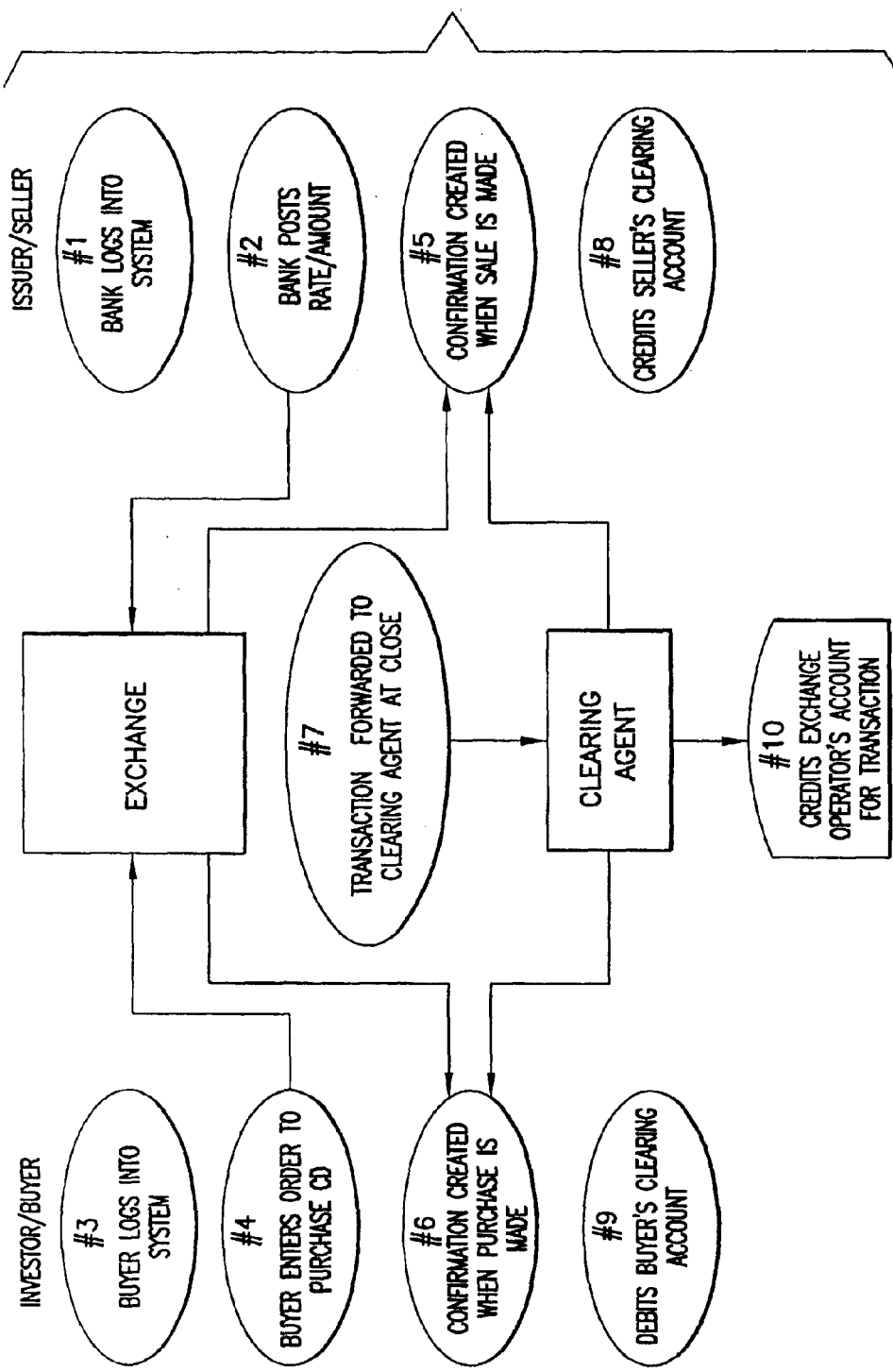
FIG. 3 shows a block diagram of certain steps carried out according to another embodiment of the present invention.

Referring now to FIG. 3, another specific example (which example is intended to be illustrative and not restrictive) of certain steps carried out in a transaction involving the Exchange of the present invention is shown. Of course, one or more other steps may be added, one or more identified steps may be deleted and/or the steps may be carried out in another order. In any case, as seen in this FIG. 3, the steps may include the following:

Step 1: An Issuer/Seller (any participating financial institution but hereinafter simply "Bank" for the purposes of this example) logs into the system.

Step 2: Bank posts rate/amount.

Step 3: An Investor/Buyer (hereinafter simply "Buyer" for the purposes of this example) logs into the system.

Step 4: Buyer enters order to purchase CD.

Step 5: Confirmation is created when sale is made.

Step 6: Confirmation is created when purchase is made.

Step 7: Transaction details forwarded to Clearing Agent (e.g., at close).

Step 8: Clearing Agent credits Seller's clearing account.

Step 9: Clearing Agent debits Buyer's clearing account.

Step 10: Clearing Agent credits Exchange Operator's account (and/or the account of any other desired entity) for transaction.

Referring now to certain example exchange fees associated with the Exchange of the present invention (which example fees are intended to be illustrative and not restrictive), it is noted that:

Annual Subscription Fees. Annual fees may be assessed to each member of the Exchange. In one example (which example is intended to be illustrative and not restrictive), the annual fees may be based on asset size.

Transaction Fees. Transaction fees may be paid on a transaction-by-transaction basis. In one example (which example is intended to be illustrative and not restrictive), the transaction fees may be paid by the Buyer in each transaction (e.g., the Buyer may receive a lower rate than the rate offered by an Issuer). The fees may be recognized as prepaid interest by the Issuer.

Still referring to certain example exchange fees associated with the Exchange of the present invention, the following specific example (which specific example is intended to be illustrative and not restrictive), is provided:

Assume that a Bank offers a 1 year rate of 1.50% and the Exchange takes a 10BP fee. The Buyer would then receive a rate of 1.40%.

The confirmation to the Bank would show that it issued a $100 k CD at 1.40% to the Buyer with prepaid interest in the amount of $100 which would result in an effective rate of 1.50%. On settlement the Bank would receive $99,900 ($100,000 less the prepaid interest of $100).

The effective rate to both the Buyer and the Seller are exactly what they bargained for—1.50% for the Seller and 1.40% for the Buyer.

In another embodiment the Exchange of the present invention may be a non-brokered trading network (e.g., a non-brokered CD trading network for institutional buyers and sellers of funds).

In another embodiment, the Exchange of the present invention may have a regulatory focus on liquidity and/or may aid in dependable deposit acquisition.

In another embodiment, the Exchange of the present invention may form a network of institutions (e.g., a national liquidity network).

In another embodiment, the Exchange of the present invention may provide the following benefits for CD sellers (including, but not limited to):

Diversification for liquidity;
Survey competitors quickly;
Publish your own rates;
Meets FDIC 4 criteria for "non-brokered" core deposits;
Change/delete rate offerings as desired; and/or
Deposit retention In another embodiment, the Exchange of the present invention may provide the following benefits for CD buyers (including, but not limited to):

Higher yields;
Eliminates brokerage fees;
Competitive market rates;

Automated investment tracking, accrual and payment reporting;

Minimal risk, CD's FDIC/NCUSIF insured; and/or

Flexible, variable CD terms

In another embodiment, the Exchange of the present invention may provide the following features (including, but not limited to):

Unlimited transactions between buyer(s) and seller(s);

No transaction fees;

Ongoing training and/or conferences; Institutional clients only;

Rate reports for regulatory compliance;

Automated safekeeping receipts;

One-touch portfolio management and tracking;

Yearly subscription fee based on asset size;

Quick and accurate Board reports (cash flow, maturity and accrual)

Automatic insurance change notifications on portfolio;

Classified as a Direct Deposit Listing Service; and/or

Easy audits

Another embodiment of the present invention provides a mechanism for a subscriber to raise non-brokered CD money, wherein: the rate is determined by a capital market; the CD maturity date is any desired time (e.g., 2-5 years) and is stipulated periodically (e.g., daily, weekly, monthly, quarterly, semi-annually, annually); the CD documents are standard for all participating institutions; the interest payment schedule is any desired time (e.g., semi-annually); the interest payment method is ACH debit; the interest rate is at or below FHLB borrowings with the same maturity; and/or the deposit classification is non-brokered.

Of note, the method embodiments described herein may, of course, be implemented using any appropriate computer hardware and/or computer software. In this regard, those of ordinary skill in the art are well versed in the type of computer hardware that may be used (e.g., a mainframe, a mini-computer, a personal computer ("PC"), a network (e.g., an intranet and/or the Internet)), the type of computer programming techniques that may be used (e.g., object oriented programming), and the type of computer programming languages that may be used (e.g., C++, Basic). The aforementioned examples are, of course, illustrative and not restrictive.

While a number of embodiments of the present invention have been described, it is understood that these embodiments are illustrative only, and not restrictive, and that many modifications may become apparent to those of ordinary skill in the art. For example, certain methods have been described herein as being "computer implementable". In this regard it is noted that while such methods can be implemented using a computer, the methods do not necessarily have to be implemented using a computer. Also, to the extent that such methods are implemented using a computer, not every step must necessarily be implemented using a computer. Further, the various steps may be performed in any desired order. Further still, while the present invention has been described principally with respect to a methods and systems, the present invention may be used in the context of a corresponding security itself (e.g., a security associated with one or more certificates of deposit). Further still, the present invention may be used in the context of any desired number of issuers, banks, manager entities, sponsors, facilitators, funding certificates, CD's etc. Further still, one or more classes of funding certificates may be issued. Further still, as mentioned above, the specific dates, time periods, prices and the like are, of course, provided simply as examples which are intended to be illustrative and not restrictive.

What is claimed is:

1. A method implemented by a programmed computer system for use in connection with a financial transaction, which method comprises the steps of:
   offering to purchase at least one CD from each of a plurality of seller banks;
   providing each of the plurality of seller banks an electronic mechanism to accept the offer;
   purchasing at least one CD from each of the plurality of seller banks via an electronic wire transfer;
   electronically recording, by a computer, each acceptance from each of the plurality of seller banks,
   aggregating, by a computer, at least a portion of the CD's from the plurality of seller banks, which are recorded as acceptances, as pooled assets associated with a funding certificate, wherein the funding certificate is a note comprising either a debt, equity or a combination of debt and equity instrument and wherein the funding certificate is represented by an electronic funding certificate; and
   issuing, by a computer, the electronic funding certificate from a funding certificate issuer to at least one investor, wherein the electronic funding certificate is for a principle amount; and
   using at least a portion of the proceeds from the issuance of the electronic funding certificate to obtain the pooled assets and wherein the principal amount of the electronic funding certificate is secured entirely by an equal principal amount of the CD's from the plurality of seller banks that results in the funding certificate that is Triple A rated.

2. The method of claim 1, wherein the funding certificate issuer is a limited liability company.

3. The method of claim 1, wherein a manager entity controls formation of the funding certificate issuer.

4. The method of claim 3, wherein the manager entity is a limited liability company.

5. The method of claim 4, wherein a sponsor owns at least a portion of voting and profit interests in the manager entity.

6. The method of claim 1, further comprising forming a plurality of funding certificate issuers, wherein each of the plurality of funding certificate issuers has associated therewith distinct pooled assets.

7. The method of claim 1, wherein each of the plurality of seller banks is: (a) a federal, state, or District of Columbia chartered depository institution, the deposits of which are FDIC insured under federal law; and (b) categorized as well capitalized under the FDIC Improvement Act of 1991.

8. The method of claim 1, wherein: (a) each of the plurality of seller banks is provided a respective offer electronically via at least one of: (i) an email message; and (ii) a website; and (b) the acceptance mechanism provided to each of the plurality of seller banks includes at least one of: (i) an email message; and (ii) a website.

9. The method of claim 1, further comprising providing each of the plurality of seller banks a mechanism to reject the offer.

10. The method of claim 9, wherein the rejection mechanism provided to each of the plurality of seller banks includes at least one of: (a) an email message; and (b) a website.

11. The method of claim 1, wherein all of the CD's comprising the pooled assets have substantially the same interest rate and stated maturity.

12. The method of claim 1, wherein each CD comprising the pooled assets is in an amount, including a yield to a stated maturity, not in excess of x dollars, wherein x is an FDIC insurance cap.

13. The method of claim 1, wherein essentially all of the proceeds from the sale of the funding certificate are used to purchase the pooled assets.

14. The method of claim 1, wherein a plurality of investors purchase the funding certificate.

15. The method of claim 1, wherein at least one of the offer to issue the funding certificate issuer a CD, the providing a mechanism to accept the offer, the sale of the funding certificate and the purchase of the pooled assets is made using an automated order entry and clearing platform.

16. The method of claim 1, wherein the steps are carried out in the order recited.

17. A method implemented by a programmed computer system for use in connection with a financial transaction, which method comprises the steps of:
purchasing at least one CD from each of a plurality of seller banks by an issuer via an electronic wire transfer;
aggregating, by a computer, at least a portion of the CD's from the plurality of seller banks as pooled assets associated with a funding certificate, wherein the funding certificate is a negotiable security issued in the public capital markets and wherein the funding certificate is represented by an electronic funding certificate;
issuing, by a computer, the electronic funding certificate from the funding certificate issuer to at least one investor, wherein the electronic funding certificate is for a principle amount; and
using at least a portion of the proceeds from the issuance of the electronic funding certificate to obtain the pooled assets.

18. The method of claim 17 wherein the issuer issues a plurality of the electronic funding certificates where each electronic funding certificate represents the corresponding funding certificate that corresponds to a specific sub-pool of CDs where each CD, in that sub-pool, has a substantially equivalent maturity date.

19. The method of claim 18 wherein the maturity date of the corresponding funding certificate corresponds to the CDs maturity date of that sub-pool.

20. The method of claim 19, wherein the steps are carried out in the order recited.

* * * * *